United States Patent
Boothby

(10) Patent No.: US 6,532,480 B1
(45) Date of Patent: *Mar. 11, 2003

(54) SYNCHRONIZATION OF DATABASES WITH RECORD SANITIZING AND INTELLIGENT COMPARISON

(75) Inventor: David J. Boothby, Nashua, NH (US)

(73) Assignee: Pumatech, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,412

(22) Filed: Apr. 11, 2000

Related U.S. Application Data

(63) Continuation of application No. 08/748,645, filed on Nov. 13, 1996, now Pat. No. 6,141,664.

(51) Int. Cl.[7] .......................... G06F 12/00; G06F 17/30
(52) U.S. Cl. .......................... 707/201; 707/8; 707/104; 707/200; 707/203
(58) Field of Search .......................... 707/201, 8, 104, 707/200, 203

(56) References Cited

U.S. PATENT DOCUMENTS

| | | | |
|---|---|---|---|
| 4,432,057 A | 2/1984 | Daniell et al. | 364/300 |
| 4,807,182 A | 2/1989 | Queen | 364/900 |
| 4,819,156 A | 4/1989 | DeLorme et al. | 364/200 |
| 4,827,423 A | 5/1989 | Beasley et al. | 364/468.02 |
| 4,866,611 A | 9/1989 | Cree et al. | 364/300 |
| 4,875,159 A | 10/1989 | Cary et al. | 364/200 |
| 4,956,809 A | 9/1990 | George et al. | 364/900 |
| 4,980,844 A | 12/1990 | Demjanenko et al. | 702/56 |
| 5,065,360 A | 11/1991 | Kelly | 395/800 |
| 5,136,707 A | 8/1992 | Block et al. | 395/600 |
| 5,142,619 A | 8/1992 | Webster, III | 395/157 |
| 5,155,850 A | 10/1992 | Janis et al. | 395/600 |
| 5,170,480 A | 12/1992 | Mohan et al. | 707/201 |

(List continued on next page.)

OTHER PUBLICATIONS

Halabi et al, An environment for Specificaiton and Execution of Multi–System, 1992 IEEE, pp. 680–690.*

Alfieri, "The Best Book of: WordPerfect Version 5.0", Hayden Books (1988), pp. 153–165 and 429–435.

"Automatically Synchronized Objects," Research Disclosure #29261, p. 614 (Aug. 1988).

Cobb et al., "Paradox 3.5 Handbook 3rd Edition," Bantam (1991), pp. 803–816.

(List continued on next page.)

*Primary Examiner*—Frantz Coby
(74) *Attorney, Agent, or Firm*—Fish & Richardson P.C.

(57) ABSTRACT

A method of synchronizing at least a first and a second database each containing dated records such as events, wherein the records of the first and second databases are synchronized across a narrow date range narrower than the date range of the records of at least one of the databases. A prior synchronization can be performed across a prior date range. The date range of the prior synchronization is stored, along with the history file containing information representative of the content of the databases following the prior synchronization. When a current synchronization is performed, it is performed across a date range that combines the prior date range with the current date range.

22 Claims, 41 Drawing Sheets

Microfiche Appendix Included
(8 Microfiche, 691 Pages)

U.S. PATENT DOCUMENTS

| | | | |
|---|---|---|---|
| 5,187,787 A | 2/1993 | Skeen et al. ................. | 395/600 |
| 5,210,868 A | 5/1993 | Shimada et al. ............ | 395/600 |
| 5,228,116 A | 7/1993 | Harris et al. .................. | 706/50 |
| 5,237,678 A | 8/1993 | Keuchler et al. ........... | 395/600 |
| 5,251,151 A | 10/1993 | Demjanenko et al. ........ | 707/56 |
| 5,251,291 A | 10/1993 | Malcolm ..................... | 395/146 |
| 5,261,045 A | 11/1993 | Scully et al. ................ | 395/161 |
| 5,261,094 A | 11/1993 | Everson et al. .............. | 395/600 |
| 5,272,628 A | 12/1993 | Koss .......................... | 364/419 |
| 5,278,978 A | 1/1994 | Demers et al. ............. | 707/101 |
| 5,278,982 A | 1/1994 | Daniels et al. .............. | 395/600 |
| 5,283,887 A | 2/1994 | Zachery ...................... | 395/500 |
| 5,293,627 A | 3/1994 | Kato et al. ................... | 395/558 |
| 5,301,313 A | 4/1994 | Terada et al. ................ | 395/600 |
| 5,315,709 A | 5/1994 | Alston, Jr. et al. .......... | 395/600 |
| 5,327,555 A | 7/1994 | Anderson .................... | 395/600 |
| 5,333,252 A | 7/1994 | Brewer, III et al. ......... | 395/148 |
| 5,333,265 A | 7/1994 | Orimo et al. ........... | 395/200.31 |
| 5,333,316 A | 7/1994 | Champagne et al. ........... | 707/8 |
| 5,339,392 A | 8/1994 | Risberg et al. .............. | 395/161 |
| 5,339,434 A | 8/1994 | Rusis .......................... | 395/700 |
| 5,355,476 A | 10/1994 | Fukumura ..................... | 707/1 |
| 5,375,234 A | 12/1994 | Davidson et al. ........... | 707/202 |
| 5,392,390 A | 2/1995 | Crozier ....................... | 395/161 |
| 5,396,612 A | 3/1995 | Huh et al. ................... | 395/575 |
| 5,434,994 A | 7/1995 | Shaheen et al. ............. | 395/500 |
| 5,444,851 A | 8/1995 | Woest .................... | 395/200.52 |
| 5,448,718 A | 9/1995 | Cohn et al. .................. | 395/404 |
| 5,463,735 A | 10/1995 | Pascucci et al. ........ | 395/200.52 |
| 5,475,833 A | 12/1995 | Dauerer et al. .............. | 395/600 |
| 5,511,188 A | 4/1996 | Pascucci et al. ............ | 707/203 |
| 5,519,606 A | 5/1996 | Frid-Nielsen et al. ....... | 364/401 |
| 5,530,939 A | 6/1996 | Mansfield, Jr. et al. ..... | 395/600 |
| 5,560,005 A | 9/1996 | Hoover et al. .............. | 395/600 |
| 5,568,402 A | 10/1996 | Gray et al. ............ | 395/200.54 |
| 5,583,793 A | 12/1996 | Gray et al. ............ | 395/200.53 |
| 5,596,574 A | 1/1997 | Perlman et al. ............. | 370/389 |
| 5,600,834 A | 2/1997 | Howard ....................... | 707/201 |
| 5,613,113 A | 3/1997 | Goldring .................... | 395/618 |
| 5,615,364 A | 3/1997 | Marks ......................... | 395/618 |
| 5,619,689 A | 4/1997 | Kelly ......................... | 395/617 |
| 5,630,081 A | 5/1997 | Rybicki et al. ............. | 395/948 |
| 5,666,530 A | 9/1997 | Clark et al. ................. | 707/201 |
| 5,666,553 A | 9/1997 | Crozier ....................... | 707/540 |
| 5,682,524 A | 10/1997 | Freund et al. ................ | 711/5 |
| 5,684,984 A | 11/1997 | Jones et al. .................... | 707/10 |
| 5,684,990 A | 11/1997 | Boothby ..................... | 707/203 |
| 5,699,517 A | 12/1997 | Yamasaki .............. | 395/200.03 |
| 5,701,423 A | 12/1997 | Crozier ....................... | 345/335 |
| 5,706,452 A | 1/1998 | Ivanov ........................ | 395/331 |
| 5,708,812 A | 1/1998 | Van Dyke et al. .......... | 395/712 |
| 5,708,840 A | 1/1998 | Kikinis et al. .............. | 395/800 |
| 5,710,922 A | 1/1998 | Alley et al. ................. | 707/201 |
| 5,727,202 A | 3/1998 | Kucala ........................ | 707/10 |
| 5,729,735 A | 3/1998 | Meyering .................... | 707/10 |
| 5,745,712 A | 4/1998 | Turpin et al. ................ | 395/333 |
| 5,758,083 A | 5/1998 | Singh et al. ........... | 395/200.53 |
| 5,758,150 A | 5/1998 | Bell et al. ................... | 707/210 |
| 5,758,355 A | 5/1998 | Buchanan ................... | 707/201 |
| 5,778,388 A | 7/1998 | Kawamura et al. ......... | 707/203 |
| 5,790,789 A | 8/1998 | Suarez .................. | 395/200.32 |
| 5,809,494 A | 9/1998 | Nguyen ......................... | 707/1 |
| 5,832,218 A | 11/1998 | Gibbs et al. ............ | 395/200.33 |
| 5,838,923 A | 11/1998 | Lee et al. .............. | 395/200.66 |
| 5,845,293 A | 12/1998 | Veghte et al. ............... | 707/202 |
| 5,870,759 A | 2/1999 | Bauer et al. ................. | 707/201 |
| 5,870,765 A | 2/1999 | Bauer et al. ................. | 707/203 |
| 5,884,323 A | 3/1999 | Hawkins et al. ............ | 707/201 |
| 5,884,324 A | 3/1999 | Cheng et al. ................ | 707/201 |
| 5,884,325 A | 3/1999 | Bauer et al. ................. | 707/201 |
| 5,892,909 A | 4/1999 | Grasso et al. .......... | 395/200.31 |
| 5,897,640 A | 4/1999 | Veghte et al. ............... | 707/202 |
| 5,926,824 A | 7/1999 | Hashimoto et al. ......... | 707/520 |
| 5,928,329 A | 7/1999 | Clark et al. ................. | 709/227 |
| 5,943,676 A | * 8/1999 | Boothby ..................... | 707/201 |
| 5,978,813 A | * 11/1999 | Foltz et al. ................. | 707/201 |
| 6,039,245 A | 3/2000 | Symonds et al. ............ | 235/379 |
| 6,141,664 A | * 10/2000 | Boothby ..................... | 707/201 |
| 6,212,529 B1 | * 4/2001 | Boothby et al. ............ | 707/201 |
| 6,223,187 B1 | * 4/2001 | Boothby et al. ............ | 707/201 |
| 6,330,568 B1 | * 12/2001 | Boothby et al. ............ | 707/201 |
| 6,405,218 B1 | * 6/2002 | Boothby ..................... | 707/201 |

OTHER PUBLICATIONS

"FRx extends reporting powre of Platinum Series: (IBM Desktop Software's line of accounting software)," Doug Dayton, PC Week, v. 8, n. 5, p. 29(2), Feb. 4, 1991.

IntelliLink Brochure (1990).

"Logical Connectivity: Applications, Requirements, Architecture, and Research Agenda," Stuart Madnick & Y. Richard Wang, MIT, System Sciences, 1991, Hawaii Int'l, vol. 1, IEEE, Jun. 1991.

"The Big Picture (Accessing information on remote data management system)", UNIX Review, v. 7, n. 8, p. 38(7), Aug. 1989.

User Manual for PC–Link for the B.O.S.S. and the PC–Link for the B.O.S.S., Traveling Software, Inc. (1989).

User Manual for Connectivity Pack for the HP 95LX, Hewlett Packard Company (1991).

Organizer Link II Operation Manual, Sharp Electronics Corporation, no date.

"Open Network Computing—Technical Overview," Sun Technical Report, Microsystems, Inc., pp. 1–32 (1987).

Zahn et al.., Network Computing Architecture, pp. 1–11; 19–31; 87–115; 117–133; 187–199; 201–209 (1990).

Bowen et al., Achieving Throughput and Functionality in a Common Architecture: The DataCycle Experiment, IEE, p. 178 (Dec. 1991).

Chapura, Inc., 3 Compare, http://www.chapura.com/3compare.html (1997), pp. 1–2.

Chapura, Inc., PilotMirror Features Page, http://www.chapura.com/features.html (1997), pp. 1–4.

Wiederhold et al., Consistency Control of Replicated Data in Federated Databases, IEEE, pp. 130–132 (Nov. 1990).

* cited by examiner

Pseudo Code for Translation Engine Control Module

100. CREATE Parameter_Table from User Input A & B database characteristics and default values
101. INSTRUCT Synchronizer to initialize itself
102. INSTRUCT Synchronizer to LOAD the History_File into its WORKSPACE
103. INSTRUCT B_Translator to LOAD all of B_records from B_Database and SEND to Synchronizer (Synchronizer STORES these records in WORKSPACE)
104. INSTRUCT A_Translator to SANITIZE B_records that were just LOADED (A_Translator USES Synchronizer services to read and write records in the WORKSPACE; Synchronizer maps these records using the B→A_Map before sending them to A_Translator and maps them back using A→B_Map before rewriting them into the WORKSPACE)
105. INSTRUCT A_Translator to LOAD all of A_records from A_Database and SEND to Synchronizer (Synchronizes STORES these records in WORKSPACE by first mapping them using the A→B_Map and then storing in their new form)
106. INSTRUCT B_Translator to SANITIZE A_records that were just LOADED (B_Translator uses Synchronizer services to read and write records in the WORKSPACE)
107. INSTRUCT Synchronizer to do CAAR (Conflict Analysis And Resolution) on all the records in WORKSPACE.
108. INFORM user exactly what steps Synchronizer proposes to take (i.e. Adding, Changing, and Deleting records). WAIT for User
109.  IF user inputs NO, THEN ABORT
110. INSTRUCT B_Translator to UNLOAD all applicable records to B_Database.
111. INSTRUCT A_Translator to UNLOAD all applicable records to the A_Database.
112. INSTRUCT Synchronizer to CREATE a new History File.

FIG. 3

Pseudocode for Generating Parameter Table

{Get Input from the user}
150. ASK user whether to synchronize based on a previously stored set of preferences (Previous_Preferences) or based on a set of new preferences (New_Preferences)
151. IF New_Preferences THEN
152.     ASK user whether Incremental_Synchronization or Synchronization_from_Scratch
153.     ASK user following information and STORE in Parameter_Table
       a. A_Application and B_Application Names
       b. ADB and BDB Names
       c. ADB and BDB Locations
       d. Which sections to Synchronize
       e. Conflict Resolution Option: IGNORE, ADD, DB WINS, BDB WINS, or NOTIFY
       f. Other user preferences
154.     ASK user whether wants default mapping for the selected sections of the two databases or wants to modify default mapping
155.     LOAD A_Database→B_Database (2)
156.     IF Default_Mapping THEN
157.         STORE A→B_Map AND B→A_Map in Parameter_Table
158.     END IF
159.     IF Modified_Mapping THEN
160.         DISPLAY A→B_Map and B→A_Map
161.         ASK user to modify Maps as desired
162.         STORE the new A→B_Map and B→A_Map in the Parameter_Table
163.     END IF
165. END IF

FIG. 4A

166. IF Previous Preferences THEN
167.     ASK user whether Incremental_Synchronization or Synchronization_from_Scratch
168.     STORE in Parameter_Table
169.     LOAD Previous Preferences regarding which databases, mapping, and so on
170.     STORE in the Parameter_Table
171. END IF
    {User now specifies Date Range}
172. ASK user to choose Date Range Option
    a.   Previously chosen Automatic_Date_Range calculated from today
    b.   Input New Automatic_Date_Range
    c.   Input static Date Range for this Synchronization
    d.   All dates
173. CALCULATE Start_Current_Date_Range and End_Current_Date_Range based on values from step 171
174. STORE in Parameter_Table
175. LOAD parameters setting out characteristics of A_Database and B_Database from Parameters database, including
    a.   Field_List_A and Field_List_B
    b.   A_Translator and B_Translator Module Identifiers
    c.   ADB_Section_Names and BDB_Section_Name
176. STORE in Parameters Table

FIG. 4B

200. RECEIVE following from Parameter Table
 1) Name of A_App
 2) Name of B_App
 3) Name and Location of A_DB
 4) Name and Location of B_DB
 5) Section name of A_Application to be synchronized
 6) Section name of B_Application to be synchronized
 7) Incremental_Synchronization or Synchronization_From_Scratch Flags
201. SEARCH for H_File matching Parameters 1-6
202. If Found H-File and Incremental_Synchronization THEN DO nothing
203. IF Found H-File and Synchronization_from_Scratch, THEN DELETE H_File
204. IF NOT found H-File, THEN SET Synchronization_from_Scratch AND ASSIGN file name for history file.
205. LOAD from Parameter_Table Start_Current_Date_Range and End_Current_Date_Range
206. LOAD from Parameter_Table Field_Lists for A-DB and B-DB and field and mapping information
207. If Incremental_Synchronization THEN COMPARE Field_Lists and Maps from Parameter_Table with History_Field_Lists and Maps
208. IF exact match THEN DO nothing
209. IF not exact match THEN DELETE H_file AND SET Synchronization_from_Scratch
210. CREATE WORKSPACE using Field_List_B
211. If Incremental_Synchronization THEN Copy H_file into WORKSPACE
212. FOR each H-Record update
 {analyze & update source of extended index}
213.    Do Nothing to NEXT_IN_FIG
214.

FIG. 5A

215. FIND H-Record with matching KeyFields
216. IF FOUND THEN Update NEXT_IN_SKG of H-Record
217. IF Appointment type and Non-Recurring record THEN
218.   IF (Start_Date after End_Previous_Date_Range) OR (End_Date before Start_Previous_Date_Range) THEN SET Bystander Flag END IF
219.   IF (Start_Date after End_Current_Date_Range) OR (End_Date before Start_Current_Date_Range) THEN SET Outside_Current_Range END IF
{Recurring records}
220. ELSE
221. Fan_Out_Recurrence_Pattern for H-Record
222. SET Bystander Flag and Outside_Current_Range Flags for H-Record
223. For all Fanned out Instances
224.   IF (Start_Date Before End_Previous_Date_Range) OR (End_Date after Start_Previous_Date_Range) THEN UN-SET Bystander Flag of Recurring H-Record END IF
225.   IF (Start_Date before End_Current_Date_Range) OR (End_Date after Start_Current_Date_Range) THEN UN-SET Outside_Current_Range END IF
226. END LOOP
227. END IF
228. END LOOP

FIG. 5B

235. LOAD Rep_Basic, Start_Date, Stop_Date, Frequency
236. CALCULATE Useful_Start_Date and Useful_Stop_Date based on Start_Date, Stop_Date, Max_Fan_Out and Usefulness_Range_Future & Past
237. REPEAT
238.     CALCULATE Next_Date based on Useful_Start_Date, Current_Date, Rep_Basic, Frequency, Max_Fan_Out
239.     IF Next_Date After Useful_Stop_Date, THEN EXIT
240.     STORE Next_Date
241.         Fan_Out_Date_Array
242.     Current_Date = Next_Date
243. END LOOP

FIG. 6

Pseudocode for Key_Field_Match

250. RECEIVE Key_Field_Hash and WORKSPACE_ID
251. For all records in WORKSPACE
252.     IF Match_Hash_Value equals Hash Values of Record THEN LOAD the two records
253.         COMPARE the key fields two records
254.         IF Exact Match THEN SET Match_Found
255.         EXIT LOOP
256.     END IF
257. END LOOP
258. If Match_Found THEN SEND Success Flag and WORKSPACE ID of Matching record

FIG. 7

Pseudo Code for Loading Records of B_database into WORKSPACE

B_Translator:

300.  FOR ALL Records in B_DB
301.      READ Record from B_DB
302.      IF (record outside of combination of Current_Date_Range and Previous_Date_Range), THEN
              GOTO END LOOP
303.      IF NOT right origin tag for this synchronization THEN GOTO END LOOP
304.      SEND Record to Synchronizer 325-236
305.  END LOOP Synchronizer:
325.  RECEIVE B_Record
326.  STORE in WORKSPACE in next available space

FIG. 8

Pseudo Code for Generic A_Sanitization of B_DB Records in Workspace

A_Translator:

350.      REPEAT
351.            FOR EVERY Field in an A_Record
352.                 REQUEST Field from Synchronizer
353.                 IF Last_Field, THEN EXIT LOOP
354.                 SANITIZE Field, according to A_Sanitization rules
355.            END LOOP
356.            IF Last_Field, THEN EXIT LOOP
357.            SANITIZE Record according to A_Sanitization rule
358.            FOR EVERY Field in an A_Record
359.                 SEND Field value to Sanitizer
360.            END FOR
361.      UNTIL EXIT

SYNCHRONIZER:

375.      In Response to Request for Field by A_Sanitizer
376.      REPEAT UNTIL LAST RECORD
377.            READ B_Record
378.            MAP Record according to B_A Map
379.            REPEAT UNTIL A_Translator Request a field from a new Record
380.                 SEND REQUESTED B_field to A_Translator
381.                 WAIT FOR RETURN of B_Field from A_Translator
382.                 STORE field Value in Mapping_Cache
383.            END LOOP
384.            MAP record in Cache according to A-B Map
385.            STORE record in WORKSPACE
386.      END LOOP
387.      SEND Last_Field flag in response to REQUEST

FIG. 9

Specific Example of Sanitization
400.   IF StartDate and EndDate are both blank
401.      Make Alarm Date blank and make Alarm Flag = FALSE
402.   ELSE IF EndDate is blank THEN SET EndDate = StartDate
403.      ELSE IF StartDate is blank OR is greater than EndDate THEN       SET StartDate = EndDate END IF 404.   IF AlarmFlag is TRUE and AlarmDate is blank THEN SET  AlarmDate = StartDate
405.      ELSE IF AlarmDate is greater than EndDate THEN SET AlarmDate = EndDate
406.   END IF

FIG. 10

Pseudo_code for Orientation Analysis (Index Value analysis)

450. FOR EVERY Record of database in WORKSPACE
451.   CALCULATE Key_Field_Hash from Section Subtype value for the record & all Mapped Key Fields
452.   CALCULATE Non_key_Fields_Hash from all Mapped Non_key Fields which are not marked as No_Reconcile
453.   CALCULATE Exclusion_List_Hash, if Recurring_Master, from Exclusion_List
454.   CALCULATE Non_Date_Hash from all non-date mapped non-key fields which are not No_Reconcile fields
455.   If B_Record THEN CALCULATE B_ID_Hash
456.   IF A_Record THEN CALCULATE A_DB_ID_Hash
457.   CALCULATE Start_Date_Time values (for Appointments and TO DO Lists)
458.   CALCULATE End_Date_Time
459.   IF Recurring Item and No instances in Current Date Range THEN SET Out_Of_Range
460.   IF (Start_Date After End_Current_Date_Range OR End_DateBefore Start_Current_Date_Range, THEN SET Out_Of_Range_Flag ELSE SET IN_Range Flag
461.   END IF
462.   IF Matching Unique ID in H_records THEN ADD to CIG
463.   IF Matching Unique ID in H_records, THEN SET WARNING FLAG
464.   IF an H or current database record with same key field values (using Key_Field_Match function, Fig. 7), THEN ADD Current Record to SKG of the H or A_record
465. END LOOP

FIG. 11

Pseudocode for Conflict Analysis And Resolution (CAAR)

500. Analyze ID_Bearing FIGS.
501. Analyze and expand ID_bearing CIGs
502. Finding Matches between Recurring Items and Non-Unique ID bearing Instances
503. Analyze SKGs
504. SET CIG Types

FIG. 12

Pseudocode for Analyzing ID_bearing FIGs

550. FOR EVERY Recurring Master of ID_Bearing FIGS in H_file
551.     FOR EVERY FIG H_Record in Recurring Master FIG
552.         REMOVE Record from SKG it belongs to
553.         IF Record is a singleton CIG, THEN ADD to New_Exclusion_List
554.         IF Record is a doubleton CIG, THEN
555.             IF the two Records in CIG are Identical, THEN remove other RECORD from its SKG
556.         END IF
557.         ELSE IF the two records are NOT Identical, THEN ADD FIG record to New_Exclusion_List and change records into singleton CIGs
        END IF
558. END LOOP
559. CREATE Synthetic Master record entry in WORKSPACE
560. COPY value from one of the CIG mates into Synthetic Master
561. COPY Rep Basic (i.e. recurrence pattern) from the Recurring Master into Synthetic Master
562. COPY Exclusion List from the database Recurring Master into Synthetic Master and MERGE with New_Exclusion_List
563. COMPUTE all Hash values for Synthetic Master
564. CREATE new FIG between Synthetic Master the CIGmates of the H-FIG records
565. CREATE CIG among the three Recurring Masters {Fan Out Creep}

566. Fan out Recurring Master with Previoius_Date_Range
567. Fan out Recurring Master with Current_Date_Range
568. IF two date arrays are NOT identical, THEN MARK CIG with Fan_Out_Creep flag
569. MARK all Records in H_File Recurring Master FIG and Synthetic Master FIG as Dependent_FIG
570. 
571. END LOOP

FIG. 13

Pseudo Code for EXPANDING ID_BASED CIGs

600. For each H_record,
601.     IF single record CIG, THEN GO TO END LOOP
602.     IF triple record CIG, THEN REMOVE CIG records from their SKGs
603.     IF Dependent_FIG, THEN GO TO END LOOP
604.     IF record needed to make triple has to be from a DB with unique ID, THEN GO TO END LOOP
605.     For all members of SKG to which H_record belongs
606.         IF Non_Key_Field_Hash of H_record and SKG_record Match, THEN
607.             IF Exact_Match of all fields with H item THEN Strong_Match is found END IF
608.         ELSE
609.             IF H_Record is a Recurring Master, THEN Find Fanned Instance (Table Recurring Master/Instance Match) which is Strong_Match
610.         END IF
611.     END LOOP
612.     IF Strong_Match is found AND IF the SKG_Record is Weak_Match member of a CIG, THEN REMOVE SKG Record from Weak_Match CIG AND Seek Alternate Weak_Match for the CIG
613.     ADD SKG record to Current doubleton CIG AND Record for the Weak_Match_CIG
614.     REMOVE all records in CIG from SKG
615.     END IF
616.     IF Strong Match is NOT found, THEN FIND Weak_Match
617.     IF Weak Match is found, THEN create Weak_CIG
618.     ELSE REMOVE all records in CIG from SKG
619.     END IF
620. END LOOP

FIG. 14

Pseudo Code for Finding Weak Matches for a Record

622.   FOR EVERY Record in SKG
623.       IF (SKG record is from same database as records for which match is sought OR
624.           SKG record already is a Weak_Match record in a CIG OR
625.           SKG record is a Dependent_FIG OR
626.           SKG record is Non_Recurring AND records for which is sought are not, OR
627.           SKG record is Recurring AND records for which is sought are not)
628.       THEN    GO TO END LOOP
629.
630.       ELSE
631.           If recurring item OR Key_Date_Field match Exactly, THEN Weak_Match is found
632.       END IF
633.   END LOOP

FIG. 15

Pseudo Code for Finding Matches between Recurring items and Non_Unique ID Bearing Instances 650. IF Instances' database does not have unique ID OR synchronizing from scratch THEN CONTINUE
651.     ELSE EXIT
652. END IF
653. FOR any Recurring_Master not in Instances database,
654.     Fan out Recurring_Master for Previous_Date_Range into Previous_Date_Array
655.     MARK all entry as Previous Date_Range Instance
656.     Fan out Current Recurring_Master for Current Data Range into Current_Dates_Array
657.     MARK all entries as Current_Date_Range_Instance
658.     MARK records in Exclusion_List as EXCLUDED_Dates
659.     MERGE Exclusion_List, Previous_Date_Array and Current_Date_Array into Merged_Date_Array
660.     CREATE Slave_Date_Array
661.     FOR EVERY item in SKG of Recurring_Master
662.         IF Recurring item OR NOT Instances database record, THEN GO TO END LOOP
663.         IF Start_Date of SKG record Matches an Entry in Merged_Date_Array THEN STORE in Slave_Array WORKSPACE record number of SKG record AND Merged_Date_Array in Slave_Array
664.     END LOOP
665.     FOR EVERY Unique Non_Date Hash of Slave_Array records
666.         FIND Slave_Array records with matching Non_Date Hash
667.         COUNT number of matches
668.     END LOOP
669.     FIND the largest number of match counts
670.     IF largest is less than 30% of number of unexcluded instances of Master Recurring, THEN EXIT

671. IF Match equals one, THEN IF NOT exact match, THEN EXIT
672. CREATE Homogenous_Instance_Group from the records which have the same Non_Date_Hash value as the largest match
673. CREATE new record Synthetic_Master in WORKSPACE
674. COPY Basic Repeat Pattern of Recurring_Master into Synthetic Master
675. COPY Other values from 1st item of Homogeneous Instance Group into Synthetic Master
676. CREATE Synthetic_Master_Exclusion_List based on differences between Merged_Date_Array and Homogeneous_Instance_Group
677. COMPUTE Hash values for Synthetic_Master
678. ADD Synthetic_Master to CIG of Recurring_Master
679. CREATE Synthetic_Master FIG from all Homogeneous_Instances_Group item
680. FOR EVERY Homogeneous_Instances_Group_item,
681.     IF Weak match in another CIG, THEN REMOVE from CIG AND FIND New WEAK MATCH for that CIG
682.     REMOVE from its SKG
683.     MARK as Dependent_FIG
684. END LOOP
685. IF dates in Previous_Date_Array which are not in Current_Date_Array OR Vice_versa THEN MARK CIG Fan_Out_Creep Flag (for unload time)
686. END LOOP Pseudocode for Completing SKG Analysis 700. IF A_database AND B_database are unique ID bearing DBs, THEN REMOVE ALL remaining H_items from SKGs
702. END IF
703. FOR ALL SKGs in WORKSPACE
704.   IF SKG is singleton, THEN GO TO END LOOP
705.   FOR ALL items in Current_SKG
706.     IF item is Weak_Match AND part of ID_based pair, THEN REMOVE from SKG
707.   END LOOP
708.   FOR ALL records in Current_SKG begining with H_Records
709.     Call Set CIG_Max_Size in Figure 18
710.     FIND Strong Match or Master/Instance Match between Non_ID bearing database record and H Records
711.     IF FOUND, THEN ADD to CIG
712.     ELSE IF FIND Strong_Match in SKG between BA and B database records
            THEN Attach records together as CIG END IF
713.   END IF
714.   IF CIG_Size = CIG_MAX_Size, THEN REMOVE ALL CIG members from SKG
715.   END LOOP
716.   IF CIG_Max_Size = 3, THEN
717.     FOR EVERY two record CIG in SKG,
718.       FIND Weak_Match (Same Key_Date_Field and Same Recurrence Level)
719.       IF Weak_Match item from opposing DB, THEN ADD to CIG
720.       REMOVE records in CIG from SKG
721.     END LOOP
722.   END IF
723.   FOR EVERY SKG item
724.     FIND Weak_Match (Same Key_Date_Field and Same Recurrence Level)
725.     IF FOUND, THEN ADD to CIG and REMOVE from SKG
726.   END LOOP
727. END LOOP

FIG. 17

Pseudocode for setting Maximum CIG Size for Every CIG analyzed in Fig. 17.

750.   CIG_Max_Size = the number of non-unique ID bearing applications +1
751.   If the CIG_Max_size = 1 and CIG is not a H_Record THEN CIG_MAX_Size = 2

FIG. 18

Pseudo Code for setting CIG types

```
800.   FOR EVERY CIG
801.       IF CIG Size is 1, THEN
802.           DETERMINE origin of the CIG record
803.               IF H_Record, THEN CIG_Type = 010
804.               IF B_Record, THEN CIG_Type = 001
805.               IF A_Record, THEN CIG_Type = 100
806.       END IF
807.       IF CIG Size is 2, THEN
808.           COMPARE the two CIG records
809.           If two members are the same, THEN
810.               DETERMINE the origin of the CIG records
811.                   IF B_Record and H_Record, THEN CIG_Type = 011
812.                   IF A_Record and H_Record, THEN CIG_type = 110
813.                   IF B_Record and A_Record, THEN CIG_type = 101
814.           END IF
815.           If two records are different, THEN
816.               DETERMINE the origin of the CIG records
817.                   IF B_Record and H_Record, THEN CIG_Type = 012
818.                   IF A_Record and H_Record, THEN CIG_type = 210
819.                   IF B_Record and A_Record, THEN CIG_type = 102
820.           END IF
```

FIG. 19A

821. END IF
822. IF CIG_Size = 3, THEN
823.    COMPARE records
824.    DETERMINE origins of records
825.    IF ALL records are the same, THEN CIG_Type = 111
826.    IF A_Record different from the other two and B_Record = H_Record, THEN CIG_Type = 211
827.    IF B_Record different from the other two and A_Record = H_Record, THEN CIG_Type = 112
828.    IF H_Record different from the other two and B_Record = A_Record, THEN CIG_Type = 212
   IF ALL records are different, THEN CIG_Type = 213
829. END IF
830. 
831. END LOOP

FIG. 19B

Conflict Resolution (Date Book)

Item:
Seminar Series on Synchronization multi-day | 1 of 1

| Field Name | Schedule + 7.0 | Pilot Organizer |
|---|---|---|
| ▶ End Time | 4:30 PM | 3:30 PM |
| Note | In room 409 | |
| Private | Yes | No |
| First Date | 10/25/1996 | 10/25/1996 |

Update ▼  Update fields in both Schedule + 7.0 and Pilot Organizer using highlighted held values ☐ Apply to all conflict OK | Stop | View | Help

FIG. 20

Pseudocode for Merging Exclusion Lists

850.     FOR ALL Recurring Masters,
851.         IF CIG_Type is 102 and conflict is unresolved THEN GO TO END LOOP
{Changing CIG TYPE}
852.         COMPARE Exclusion_Lists of Current_CIG A and B records to determine Exclusion instances which appear in only one of the two records (i.e. One_Side_Only_Exclusion)
853.         IF None THEN do nothing
854.             ELSE IF One_side_only_Exclusion in A_Record but not in B THEN USE Table in FIG. 22 to Convert CIG_Type
855.             ELSE IF One_Side_Only_Exclusion in B record but not in A THEN USE Table in FIG. 23 to Convert CIG_Type
856.             ELSE IF One_Side_Only_Exclusion in both records, THEN USE Table in FIG. 24 to convert CIG_Type
857.         END IF
858.     END LOOP

FIG. 21

| Old CIG + choice | new CIG | new Conflict Resolution Choice | Other Instructions & Comments |
|---|---|---|---|
| 101 | 102 | ADB Wins | |
| 111 | 211 | | |
| 112 | 132 | | Replace H_Record with a copy of the B_Record, plus the ADB Exclusion List |
| 211 | 211 | | |
| 212 | 213 | ADB Wins | |
| 132 | 132 | | Copy ADB ExclusionList into P-Item |
| 102-Ig | 102 | Ignore | |
| 102-SW | 102 | ADB Wins | |
| 102-TW | 132 | | Create H_Record by copying the B_Record, plus the ADB Exclusion List |
| 213-Ig | 213 | ADB Wins, Excl Only | The Excl Only flag is set so that only the Exclusion List will be updated. Other BDB Fields will remain unchanged. |
| 213-SW | 213 | ADB Wins | |
| 213-TW | 132 | | Replace P-Item with a copy of the B_Record, plus the ADB Exclusion List |

FIG. 22

(Ig for Ignore, SW for ADB Wins, or TW for BDB Wins).

| Old CIG + choice | new CIG | new Conflict Resolution Choice | Other Instructions & Comments |
|---|---|---|---|
| 101 | 102 | BDB Wins | |
| 111 | 112 | | |
| 112 | 112 | | |
| 211 | 132 | | Replace P-Item with a copy of the A_Record, plus the BDB Exclusion List |
| 212 | 213 | BDB Wins | |
| 132 | 132 | | Copy BDB ExclusionList into P-Item |
| 102-Ig | 102 | Ignore | |
| 102-SW | 132 | | Create P-Item by copying A_Record, plus the BDB Exclusion List |
| 102-TW | 102 | BDB Wins | |
| 213-Ig | 213 | BDB Wins, Excl Only | The Excl Only flag is set so that only the Exclusion List will be updated. Other ADB Fields will remain unchanged. |
| 213-SW | 132 | | Replace P-Item with a copy of the A_Record, plus the BDB Exclusion List |
| 213-TW | 213 | BDB Wins | |

FIG. 23

(Ig for Ignore, SW for ADB Wins, or TW for BDB Wins)

| Old CIG + choice | new CIG | new Conflict Resolution Choice | Other Instructions & Comments |
|---|---|---|---|
| 101 | 132 | | Create P-Item by copying B_Record, plus the Merged Exclusion List |
| 111 | 132 | | Copy Merged Exclusion List into P-Item. |
| 112 | 132 | | Replace P-Item with a copy of the B_Record, plus the Merged Exclusion List |
| 211 | 132 | | Replace P-Item with a copy of the A_Record, plus the Merged Exclusion List |
| 212 | 132 | | Replace P-Item with a copy of the B_Record, plus the Merged Exclusion List |
| 132 | 132 | | Copy Merged ExclusionList into P-Item |
| 102-Ig | 102 | Ignore | |
| 102-SW | 132 | | Create P-Item by copying A_Record, plus the Merged Exclusion List |
| 102-TW | 132 | | Create P-Item by copying B_Record, plus the Merged Exclusion List |
| 213-Ig | 132 | Excl Only | Copy Merged ExclusionList into P-Item. The Excl Only flag is set so that only the Exclusion List will be updated. Other ADB and BDB Fields will remain unchanged. |
| 213-SW | 132 | | Replace P-Item with a copy of the A_Record, plus the Merged Exclusion List |
| 213-TW | 132 | | Replace P-Item with a copy of the B_Record, plus the Merged Exclusion List |

FIG. 24

(Ig for Ignore, SW for ADB Wins, or TW for BDB Wins)

Pseudo Code for Unloading Records from WORKSPACE to a database for non_rebuild_all database 899. FOR all Recurring Masters which require Fanning and Outcome is UPDATE or DELETE, call Synchronizer Function Fanning for Unloading, Fig.27
900. COUNT RECORDS to be Unloaded by examining all CIGs
901. FOR EVERY RECORD to be Unloaded
{DETERMINE OUTCOME}
902.   IF MARKED GARBAGE, THEN SKIP
903.   IF BYSTANDER AND NOT History File Unload, THEN SKIP
904.   IF WRONG_SUBTYPE AND NOT Rebuild_All Translator, THEN SKIP
905.   IF Recurring_Master THEN IF Fanned for the database THEN UNLOAD Instances when unloading END IF
            ELSE UNLOAD Recurring Master when unloading
906.   END IF
907.   LOOK UP Outcome_Sync (i.e., Unload Instructions) in Fig. 26 Table based on CIG_TYPE]
908.   IF Date Range Limited Database and Date_Range_Option = LENIENT, THEN
909.      IF RECORD is Out of Current_Date_Range AND Outcome is not DELETE, THEN SKIP Record
910.   ELSE IF Date Range Limited Database and Date_Range_Option = STERN, THEN
911.      IF RECORD is Out of Current_Date_Range, THEN Outcome=DELETE
912.   END IF
913.   IF Outcome = DELETE, THEN
914.      Get Info Required for this database to DELETE RECORD
915.      (may include unique ID, Record ID, or the original values of one or more key fields, to look up record so that it can be deleted)
916.      DELETE Record
917.      SEND Synchronizer SUCCESS/FAILURE FLAG
918.   END IF

FIG. 25A

```
920.  IF Outcome = ADD, THEN
921.      GET Current values of all Fields, from Synchronizer
           (Synchronizer maps for A database based on B→A, in response to each request)
922.      CREATE new RECORD in DB
923.      IF Unique_ID DB, THEN GET Unique_ID
924.      SEND to Synchronizer (Success FLAG with any Unique_ID) OR (Failure Flag)
925.      Synchronizer: Store Unique_ID in WORKSPACE
926.  END IF
927.  IF Outcome is UPDATE THEN GET Current values to be unloaded and original values loaded
       from database from Synchronizer
928.      COMPARE and DETERMINE which Field to be updated
929.      UPDATE fields in the record to be updated
930.      SEND to Synchronizer (Success flag AND Unique_ID) OR (Failure Flag)
931.      Synchronizer: STORE Unique_ID in WORKSPACE
932.  END IF
933. END LOOP
```

FIG. 25B

```
// Original   Current
// Item       Item     Outcome
// -------    -------  -------
{

//--- TIFCIG_001 - 1  (0) // item is present in BDB only

B,         B,        oLEAVE_ALONE,   // unloading to BDB
     B,         B,        oADD,           // unloading to ADB
     B,         B,        oSAVE,          // unloading to History File
```

//--- CIG_100 - 1 (1) // item is present in ADB only

```
     A_         A_        oADD,           // unloading to BDB
     A_         A_        oLEAVE_ALONE,   // unloading to ADB
     A_         A_        oSAVE,          // unloading to History File
```

//--- CIG_101 - 1 (2) // item is identical in ADB and BDB

```
     B_         B_        oLEAVE_ALONE,   // unloading to BDB
     A_         A_        oLEAVE_ALONE,   // unloading to ADB
     A_         B_        oSAVE,          // unloading to History File
```

//--- CIG_102 - 1 (3) // NEW ADB ITEM < > NEW BDB ITEM
//                      (the BDB WINS outcome is shown here)

```
     B_         B_        oLEAVE_ALONE,   // unloading to BDB
     A_         B_        oUPDATE,        // unloading to ADB
     A_         B_        oSAVE,          // unloading to History File
```

//--- CIG_111 - 1 (4) // item is unchanged across the board

```
     B_         B_        oLEAVE_ALONE,   // unloading to BDB
     A_         A_        oLEAVE_ALONE,   // unloading to ADB
     H_         H_        oSAVE,          // unloading to History File
```

//--- CIG_112 - 1 (5) // item CHANGED in BDB since last sync

```
     B_         B_        oLEAVE_ALONE,   // unloading to BDB
     A_         B_        oUPDATE,        // unloading to ADB
     H_         B_        oSAVE,          // unloading to History File
```

//--- CIG_110 - 1 (6) // item DELETED from BDB since last sync

```
     H_         H_        oLEAVE_DELETED, // unloading to BDB
     A_         A_        oDELETE,        // unloading to ADB
     H_         H_        oDISCARD,       // unloading to History File
```

//--- CIG_211 - 1 (7) // item CHANGED in ADB since last sync

```
     B_         A_        oUPDATE,        // unloading to BDB
```

FIG. 26A

```
    A_      A_      oLEAVE_ALONE.    // unloading to ADB
    H_      A_      oSAVE.           // unloading to History File //--- CIG_212 - 1  (8) // item CHANGED IDENTICALLY in Src & BDB B_      B_      oLEAVE_ALONE.    // unloading to BDB
    A_      A_      oLEAVE_ALONE.    // unloading to ADB
    H_      A_      oSAVE.           // unloading to History File //--- CIG_213 - 1  (9) // item CHANGED DIFFERENTLY in Src & BDB
                       // (the BDB WINS outcome is shown here)

B_      B_      oLEAVE_ALONE.    // unloading to BDB
    A_      B_      oUPDATE.         // unloading to ADB
    H_      B_      oSAVE.           // unloading to History File //--- CIG_210 - 1  (10) // CHANGED in ADB, DELETED from BDB A_      A_      oADD.            // unloading to BDB
    A_      A_      oLEAVE_ALONE.    // unloading to ADB
    H_      A_      oSAVE.           // unloading to History File //--- CIG_011 - 1  (11) // item DELETED from ADB since last sync B_      B_      oDELETE.         // unloading to BDB
    H_      H_      oLEAVE_DELETED,  // unloading to ADB
    H_      H_      oDISCARD.        // unloading to History File //--- CIG_012 - 1  (12) // DELETED from ADB, CHANGED in BDB B_      B_      oLEAVE_ALONE,    // unloading to BDB
    B_      B_      oADD,            // unloading to ADB
    H_      B_      oSAVE.           // unloading to History File //--- CIG_010 - 1  (13) // item DELETED from both ADB & BDB H_      H_      oLEAVE_DELETED.  // unloading to BDB
    H_      H_      oLEAVE_DELETED,  // unloading to ADB
    H_      H_      oDISCARD.        // unloading to History File //--- CIG_132 - 1  (14) // 102 conflict resolved interactively
                       // to a "compromise" value stored in P-item
                       // outcome is always UPDATE BOTH B_      H_      oUPDATE.         // unloading to BDB
    A_      H_      oUPDATE.         // unloading to ADB
    A_      H_      oSAVE.           // unloading to History File //--- CIG_13F - 1  (15) // 132 UPDATE-BOTH
                       // which has been Fanned To BDB B_      B_      oDELETE.         // unloading to BDB
    A_      H_      oUPDATE.         // unloading to ADB
    A_      H_      oSAVE            // unloading to History File
```

FIG. 26B

// Note that we delete the recurring master on the BDB Side;
// fanned instances take its place.

};

The table entries above for CIG_102 and CIG_213 are only relevant when the Conflict Resolution Option is set to BDB WINS. If the Conflict Resolution Option is set to IGNORE or ADB WINS then those table entries are adjusted accordingly. For IGNORE we use the following table entries:

```
// Original  Current
// Item      Item      Outcome
// -------   -------   -------
//--- _CIG_TYPE_102   // NEW ADB ITEM < > NEW BDB ITEM B_        B_       oLEAVE_ALONE.  // unloading to BDB
    A_        A_       oLEAVE_ALONE.  // unloading to ADB
    B_        B_       oDISCARD.      // unloading to History File //--- _CIG_TYPE_213   // item CHANGED DIFFERENTLY in Src & BDB B_        B_       oLEAVE_ALONE.  // unloading to BDB
    A_        A_       oLEAVE_ALONE.  // unloading to ADB
    H_        H_       oSAVE,         // unloading to History File
```

And for ADB WINS we use the following table entries:

```
// Original  Current
// Item      Item      Outcome
// -------   -------   -------

//--- _CIG_TYPE_102   // NEW ADB ITEM < > NEW BDB ITEM

B_        A_       oUPDATE.       // unloading to BDB
    A_        A_       oLEAVE_ALONE,  // unloading to ADB
    B_        A_       oSAVE,         // unloading to History File //--- _CIG_TYPE_213   // item CHANGED DIFFERENTLY in Src & BDB B_        A_       oUPDATE,       // unloading to BDB
    A_        A_       oLEAVE_ALONE,  // unloading to ADB
    H_        A_       oSAVE,         // unloading to History File
```

When the NOY option is in effect, CIG-specific conflict outcomes are recorded in the CIG members' flag bits. When this is the case the following lookup table is used:

```
static unsigned char TableAfterILCR [_SYNC_OUTCOME_COUNT]
                        [AFTER_ILCR_CIG_TYPE_COUNT]
                        [SYNC_UNLOAD_PHASE_COUNT]
                        [3] =
// Original  Current
// Item      Item      Outcome
// -------   -------   -------
{
```

FIG. 26C

```
//-------------------- Entries for _OUTCOME_SYNC_BDB_WINS

//--- _CIG_TYPE_102   // NEW ADB ITEM < > NEW BDB ITEM

B_      B_      oLEAVE_ALONE,   // unloading to BDB
        A_      B_      oUPDATE,        // unloading to ADB
        A_      B_      oSAVE,          // unloading to History File //--- _CIG_TYPE_213   // item CHANGED DIFFERENTLY in Src & BDB B_      B_      oLEAVE_ALONE,   // unloading to BDB
        A_      B_      oUPDATE,        // unloading to ADB
        H_      B_      oSAVE,          // unloading to History File //-------------------- Entries for _OUTCOME_SYNC_ADB_WINS

//--- _CIG_TYPE_102   // NEW ADB ITEM < > NEW BDB ITEM

B_      A_      oUPDATE,        // unloading to BDB
        A_      A_      oLEAVE_ALONE,   // unloading to ADB
        B_      A_      oSAVE,          // unloading to History File //--- _CIG_TYPE_213   // item CHANGED DIFFERENTLY in Src & BDB B_      A_      oUPDATE,        // unloading to BDB
        A_      A_      oLEAVE_ALONE,   // unloading to ADB
        H_      A_      oSAVE,          // unloading to History File //-------------------- Entries for IGNORE (LEAVE UNRESOLVED)

//--- _CIG_TYPE_102   // NEW ADB ITEM < > NEW BDB ITEM

B_      B_      oLEAVE_ALONE,   // unloading to BDB
        A_      A_      oLEAVE_ALONE,   // unloading to ADB
        B_      B_      oDISCARD,       // unloading to History File //--- _CIG_TYPE_213   // item CHANGED DIFFERENTLY in Src & BDB B_      B_      oLEAVE_ALONE,   // unloading to BDB
        A_      A_      oLEAVE_ALONE,   // unloading to ADB
        H_      H_      oSAVE           // unloading to History File }; //---- TableAfterILCR
```

FIG. 26D

FANNING Recurring_Items for Unloading (for A DB)

Fan Pattern for paper Date Range (Fig. XX)

950. IF Outcome is UPDATE, THEN
951.   IF (CIG A_Record was a Recurring Master but now to be fanned and CIG B_Record is a Recurring Master) THEN IF CIG_Type = 132 THEN CIG_Type = 13F
952.     GOTO Fanning For ADD
953.   ELSE
954.     SET A_Record CIG_Type to 100
955.     SET B_Record CIG_Type to 001
956.     SET H_Record CIG_Type to 010
957.     MARK A_Record with DELETE_ME Flag
958.     GOTO Fanning for Add
959.   END IF
960. END IF
961. IF (CIG A_Records were fanned previously and Fanned now) AND (CIG B_record recurring), THEN
962.   FOR ALL A items in Synthetic Master FIG
963.     STORE Start_Date in Date_Array_Temporary
964.   END LOOP
965.   Fan_Out Recurring_Pattern of B Master
966.   COMPARE Date_Array_Temp with Fan_Out_Date_Array
967.   MARK Dates which NOT IN Fan_Out_Date Array with DELETE_Me Flag
968.   IF Date NOT IN Date_Array_Temp, THEN
969.     CREATE WORK SPACE Record by Copy Recurring_Master but Omit Rep Basic, Rep Excl, Unique ID Field
970.     SET Start_Date, End_Date, Alarm_Date to values for Current Instance
971.     Compute Hash
972.     MARK Fanned_For_A
973.   END IF

FIG. 27A

974. IF Date in Date_Array_Temp AND Fan_Out_Date_Array THEN
975. Compare Non_Date Hash to Synthetic Master Non_Date_Hash
976. IF Same, THEN MARK Leave_Alone
977. ELSE MARK UPDATE END IF
978. END IF
979. END IF
980. IF (A_Record Recurring previously and to be Fanned now) AND (CIG B_Record is Instances) THEN
981. MARK CIG items as Garbage
982. MARK FIG items of CIG H_record as Garbage
983. MAKE FIG items of CIG B_record singletons
984. END IF
985. ELSE [Fanning For Add]
986. Fan out Recurrence Pattern
987. For each Date in Fan_Out_Date_Array
988. COPY Master item into new WORKSPACE Record except Omit Rep_Basic, Rep_Exclusion, and Unique ID
989. Use Date for Start Date and End Date
990. Set Alarm Date, if necessary
991. Compute Hash Values
992. Attach to Recurring_Master FIG
993. Set Fanned_for_A Flag
994. END LOOP
995. END IF

FIG. 27B

Pseudocode for Unloading History FILE

1000. ERASE previous History File and CREATE new one
1001. FOR EVERY CIG in WORKSPACE
1002.   Look up in Fig. 26 Table based on CIG_Type AND DETERMINE whether should be unloaded into the History File
1003.   IF NO THEN GOTO END LOOP
1004.   IF Exclusion_List_Only Flag is set when merging of Exclusion_List THEN REPLACE History RECORD Exclusion_List with new Merged Exclusion_List
1005.   Clear all Flag bits except for Recurring_Record flag
1006.   SET origin flag to History_Record
1007.   Clear FIG, SKG and CIG words
1008.   STORE Applicable Unique IDs
1009.   IF Recurring item, THEN STORE ALL ID_Bearing FIG records AND SET their FIG in History_File to keep them together
1010.   STORE Record in History File
1011.   IF current record is a recurring master for an ID-bearing FIG THEN STORE FIG Records(i.e. all Fanned Instances) in the History File, with the FIG linkage words set in the History File to hold the FIG together.
1012. END LOOP
1013. STORE Field Lists, Application Names, Database Names, Current Date Range,

FIG. 28

| | How Item is stored in Other Database | How stored in Unloader's Database Before Fanning For Update | How stored in Unloader's Database After Fanning For Update |
|---|---|---|---|
| 1 | Master | Master | Instances |
| 2 | Master | Instances | Instances |
| 3 | Instances | Master | Instances |

FIG. 29

1050. Verify History File
1051.     If verified, Then Proceed as Fast Synch
1052.     If not, Then Proceed as Synchronization from Scratch load all record in databasse 1053. If Fast Synch
1054.     LOAD records into the Workspace. Map if necessary
1055.     Sanitize Records not marked as Deletion
1056.     Orientation analysis (Fig. 11).
1057.     For each H_Record, analyze the CIG that the H_Record belongs to.
1058.         IF the H_Record's CIG contains no Record from the Fast Synchronization database, THEN CLONE the H-Item, label it a Fast Synchronization Record, and add it to the H_Record's CIG.
1059.         If the H_Record's CIG contains a Fast Synchronization record that is marked as a a Deletion, it is now removed from the CIG.
1060.         If the H_Record's CIG contains a non-Delete Fast Synchronization Record, then do nothing.
1061.     END LOOP

FIG. 30

1150. Verify History File
1151.   If verified, Then Proceed as Fast Synch
1152.   If not, Then Proceed as Synchronization from Scratch
1153. IF synchronization from scratch
1154.   IF record outside of current_date_range THEN MARK record as out-of-range
1155. If Fast Synch
1156.   Load History File into Workspace
1157.   MARK History File records outside of previous_date_range as Bystander
1158.   Load All Fast Synchronization Records into the Workspace; mapped if necessary.
1159.   SANITIZE Records which are not DELETEs
1160.   Orientation analysis (Fig. 11).
1161.   If Added Fast Synchronization record is out of current date range THEN MARK Out-Of_Range
1162.   If Changed or deleted Fast Synchronization record in a CIG with Bystander H_Record, MARK the Bystander record as Garbage

FIG. 31A

1163. For each H_Record, analyze the CIG that the H_Record belongs to.
1164. If the H_Record's CIG contains no Record from the Fast Synchronization database, then make a clone of the H-Item, label it a Fast Synchronization Record, and adding it to the H_Record's CIG.
1165. If H_Record is not a Bystander, THEN Make a clone of H_Record, mark as Fast Synchronization record, and Add to CIG
1166. IF H_Record is Bystander THEN
1167.    IF outside of Current date range THEN Do Nothing
1168.    ELSE {Within Current Date Range}
1169.       Mark H_Record as Garbage, Clone H_Record and Mark it as from Fast Synchronization database
1170.    END IF
1171. END IF
1172. If the H_Record's CIG contains a Fast Synchronization record that is marked as a deletion, it is now removed from the CIG.
1173. If the H_Record's CIG contains a non-deletion Fast Synchronization Record, then do nothing.
1174. Any Fast Synchronization records which are not joined to any H_Record's CIG represent additions and no transformation is required.
1175. END LOOP

FIG. 31B

SYNCHRONIZATION OF DATABASES WITH RECORD SANITIZING AND INTELLIGENT COMPARISON

CROSS REFERENCE TO RELATED APPLICATION

This application is a continuation of U.S. application Ser. No. 08/748,645, filed on Nov. 13, 1996, now U.S. Pat. No. 6,141,664.

REFERENCE TO MICROFICHE APPENDIX

An appendix forms part of this application. The appendix, which includes a source code listing relating to an embodiment of the invention, includes 691 frames on 8 microfiche.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

BACKGROUND OF THE INVENTION

This invention relates to synchronizing incompatible databases.

Databases are collections of data entries which are organized, stored, and manipulated in a manner specified by applications known as database managers (hereinafter also referred to as "Applications"). The manner in which database entries are organized in a database is known as the data structure. There are generally two types of database managers. First are general purpose database managers in which the user determines (usually at the outset, but subject to future revisions) what the data structure is. These Applications often have their own programming language and provide great flexibility to the user. Second are special purpose database managers that are specifically designed to create and manage a database having a preset data structure. Examples of these special purpose database managers are various scheduling, diary, and contact manager Applications for desktop and handheld computers. Database managers organize the information in a database into records, with each record made up of fields. Fields and records of a database may have many different characteristics depending on the database manager's purpose and utility.

Databases can be said to be incompatible with one another when the data structure of one is not the same as the data structure of another, even though some of the content of the records is substantially the same. For example, one database may store names and addresses in the following fields: FIRST_NAME, LAST_NAME, and ADDRESS. Another database may, however, store the same information with the following structure: NAME, STREET_NO., STREET_NAME, CITY_STATE, and ZIP. Although the content of the records is intended to contain the same kind of information, the organization of that information is completely different.

It is often the case that users of incompatible databases want to be able to synchronize the databases. For example, in the context of scheduling and contact manager Applications, a person might use one Application on the desktop computer at work while another on his handheld computer or his laptop computer at home. It is desirable for many of these users to be able to synchronize the entries on one with entries on another. However, the incompatibility of the two databases creates many problems that need to be solved for successful synchronization. The U.S. patents of the assignee hereof, Puma Technology, Inc., of San Jose, Calif. (U.S. Pat. Nos. 5,392,390 and 5,684,990, incorporated by reference herein) show two methods for synchronizing incompatible databases and solving some of the problems arising from incompatibility of databases. However, other problems remain.

Some database Application run on computer systems with very limited storage capacity, such as handheld computers. It is often desirable to synchronize the databases on these devices with databases on larger computers such as desktop computers which have much higher storage capacity. However, a straight synchronization between the Applications on the two devices may result in storage capacity of the smaller devices being mostly consumed with the records from the larger device, rendering the smaller device inoperable.

SUMMARY OF THE INVENTION

In a first aspect, the invention allows comparison of records from two different databases where at least one of the databases is subject to rules of data value to which the other database is not subject. The rules of data value of one database are used to change copies of the records of the other database so that a meaningful comparison can be made.

The invention features a computer implemented method of synchronizing records of first and second databases, wherein at least one field of records of the first database is subject to a first rule of data value to which the corresponding field of records of the second database is not subject. The first rule of data value of a field of the first database is used to modify copies of the content of corresponding fields of records of the second database. Thereafter, the content of the modified copies is compared to the content of the corresponding field of the first database, and synchronization actions are taken based on the outcome of the comparison.

In preferred embodiments, at least one field of records of the second database is subject to a second rule of data value to which the corresponding field of records of the second database is not subject, and the second rule of data value is used to modify copies of the content of corresponding fields of records of the first database; and the content of modified copies of the content of the first database is compared to modified copies of the content of the second database.

The invention may take into account rules of data value at the time of comparison. For example, two text fields may be compared only up to the character limit of one of them.

The invention provides a method of synchronizing multiple databases of different Applications. A database's record, when written in another database may be tagged with a unique mark identifying the source of the record. These tags may be used to filter out only those records which should be synchronized. The tags may be attached when the records are unloaded to the databases.

The invention also provides for using certain design characteristics of certain Applications to speed up the synchronization process. Some Applications provide information for keeping track of which records were changed, deleted, or added since the last synchronization. The invention uses these features to speed up the synchronization process by focusing only on those records which have been affected since the last synchronization.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of preferred embodiments, including the drawings, and from the claims.

DESCRIPTION OF DRAWINGS

FIG. 3 is the pseudocode for the Translation Engine Control Module.

FIGS. 4a–4b is the pseudocode for generating the parameter Table.

FIGS. 5a–5b is the pseudocode for fanning a recurring record.

FIG. 6 is the pseudocode for the Synchronizer loading the History File.

FIG. 7 is the pseudocode for matching key fields (Key_Field_Match).

FIG. 8 is the pseudocode for loading records of B_Database into Workspace.

FIG. 9 is the pseudocode for A_Sanitization of B_Database records in Workspace.

FIG. 10 is the Pseudocode for a specific example of a rule of data value used for sanitization.

FIG. 11 is the pseudocode for orientation analysis.

FIG. 12 is the pseudocode for Conflict Analysis And Resolution (CAAR).

FIG. 13 is the pseudocode for analyzing unique ID bearing Fanned Instance Groups (FIGs).

FIG. 14 is the pseudocode for expanding CIGs created from unique ID bearing records.

FIG. 15 is the pseudocode for finding weak matches for a record.

FIGS. 16a–16b is the pseudocode for finding matches between recurring items and non_unique ID bearing instances.

FIG. 17 is the pseudocode for completing Same Key Group (SKG) analysis.

FIG. 18 is the pseudocode for setting the Maximum_CIG_Size for every CIG analyzed in FIG. 17.

FIGS. 19a–19b is the pseudocode for setting CIG_Types.

FIG. 20 is the User Interface for conflict resolution when the Notify option is selected.

FIG. 21 is the pseudocode for merging exclusion lists.

FIG. 22 is a look up table used by the function in FIG. 21.

FIG. 23 is a look up table used by the function in FIG. 21.

FIG. 24 is a look up table used by the function in FIG. 21.

FIGS. 25a–25b is a pseudocode for unloading records from Workspace to a non-rebuild-all database.

FIGS. 26a–26d is the look up table for determining unloading outcome results.

FIGS. 27a–27b is the pseudocode for fanning recurring records of A-Database for unloading.

FIG. 28 is the pseudocode for unloading the History File.

FIG. 29 is a table showing cases for fanning Recurring Masters into own database.

FIG. 30 is the pseudocode for loading records by a fast synchronization Translator.

FIGS. 31a–31b is the pseudocoe for loadin records by a fast synchronization Translator.

DESCRIPTION OF THE PREFERRED EMBODIMENTS

Figure 1:
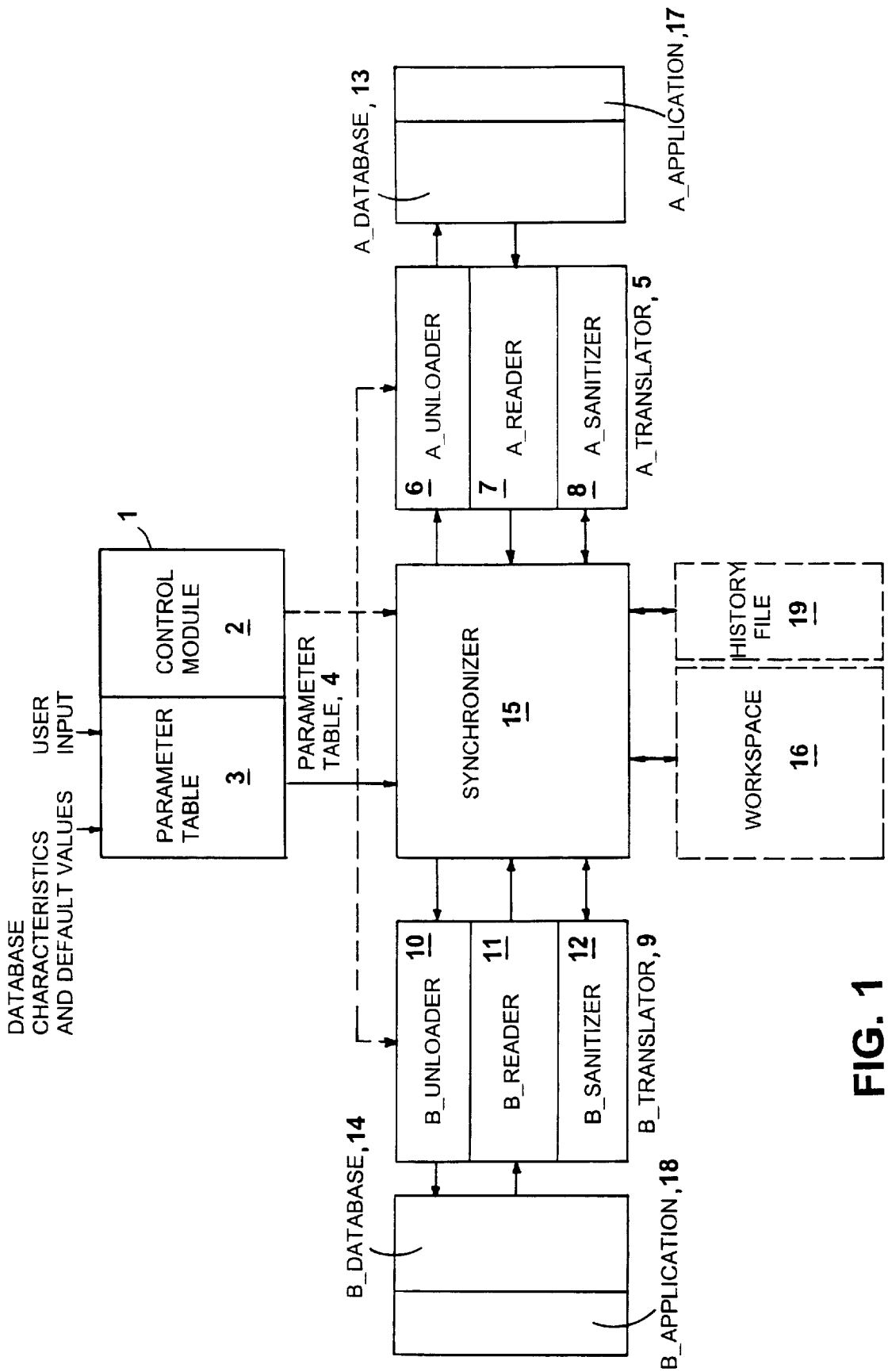
FIG. 1 is a schematic drawing of the various modules constituting the preferred embodiment.

FIG. 1 shows the relationship between the various modules of the preferred embodiment. Translation Engine 1 comprises Control Module 2 and Parameters Table Generator 3. Control Module 2 is responsible for controlling the synchronizing process by instructing various modules to perform specific tasks on the records of the two databases being synchronized. The steps taken by this module are demonstrated in FIG. 3. The Parameters Table Generator 3 is responsible for creating a Parameter_Table 4 which is used by all other modules for synchronizing the databases. Details of the Parameter_Table are described in more detail below. The Synchronizer 15 has primary responsibility for carrying out the core synchronizing functions. It is a table-driven code which is capable of synchronizing various types of databases whose characteristics are provided in the Parameter_Table 4. The Synchronizer creates and uses the Workspace 16, which is a temporary data array used during the synchronization process.

A Translator 5 (A_Translator) is assigned to the A_database 13 and another Translator 9 (B_Translator) to the B_database 14. Each of the database Translators 5 and 9 comprises three modules: Reader modules 6 and 10 (A_Reader and B_Reader), which read the data from the databases 13 and 14; Unloader modules 8 and 12 (A_Unloader and B_Unloader), which analyze and unload records from the Workspace into the databases 13 and 14; and Sanitizing modules 7 and 11 (A_Sanitizer and B_Sanitizer), which analyze the records of the other database loaded into the Workspace and modify them according to rules of data value of its own database. In the preferred embodiment, the modules of the A_Translator 5 are designed specifically for interacting with the A_database 13 and the A_Application 17. Their design is specifically based on the record and field structures and the rules of data value imposed on them by the A_Application, the Application Program Interface (API) requirements and limitations of the A_Application and other characteristics of A_Database and A_Application. The same is true of the modules of B_Translator 9. These Translators are not able to interact with any other databases or Applications. They are only aware of the characteristics of the database and the Application for which they have been designed. Therefore, in the preferred embodiment, when the user chooses two Applications for synchronization, the Translation Engine chooses the two Translators which are able to interact with those Applications. In an alternate embodiment, the translator can be designed as a table-driven code, where a general Translator is able to interact with a variety of Applications and databases based on the parameters supplied by the Translation Engine 1.

Figure 2:
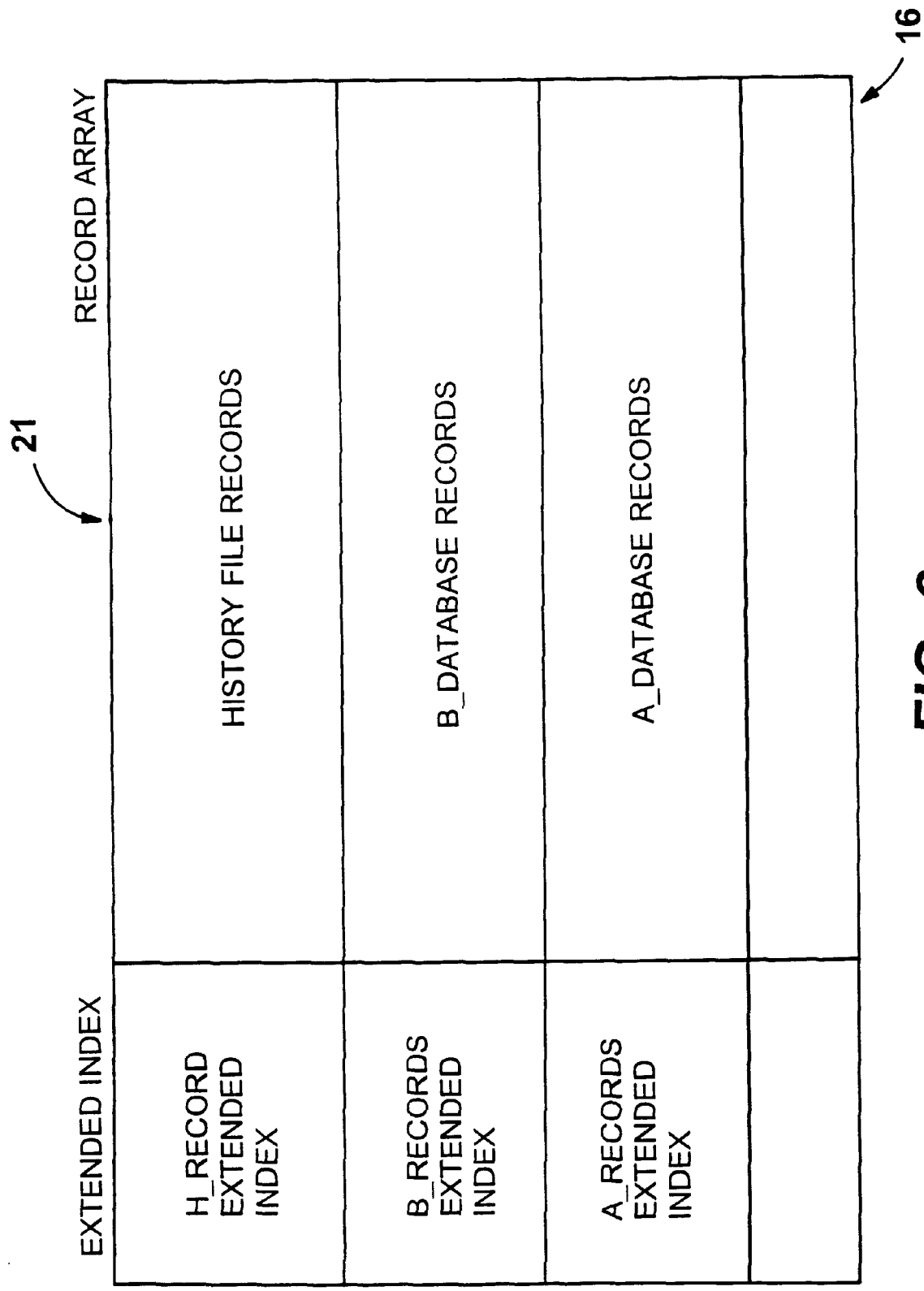
FIG. 2 is a representation of the Workspace data array.

Referring to FIGS. 1, 2 and 3, the synchronization process is as follows. The Parameter_Table 4 is generated by the Parameter Table Generator 3. The Synchronizer 15 then creates the Workspace 16 data array and loads the History File 19 into the Workspace 16. The B_Reader module 11 of the B_Translator reads the B_database records and sends them to the Synchronizer for writing into the Workspace. Following the loading of B_Database records, the A_Sanitizer module 8 of the A_Translator 5 sanitizes the B_Records in the Workspace. The A_Reader module 7 of the A_Translator 5 then reads the A_Database records and sends them to the Synchronizer 16 for writing into the Workspace. The B_Sanitizer module 12 of the B_Translator 9 then sanitizes the A_Records in the Workspace. The Synchronizer then performs the Conflict Analysis and Resolution (CAAR) on the records in Workspace. At the end of this analysis the user is asked whether he/she would like to proceed with updating the A_ and B_databases. If so, the B_Unloader module of the B_Translator unloads the appropriate records into the B_database. The A_Unloader module 6 then performs the same task for the A_Database. Finally, the Synchronizer creates a new History File 19.

FIG. 3 is the pseudocode for the preferred embodiment of the Control Module 2 of the Translation Engine 1. Control Module 2 first instructs the Parameter Table Generator 3 of the Translation Engine 1 to create the Parameter_Table (Step 100). FIGS. 4a–4b is the pseudocode for the preferred embodiment of the Parameter Table Generator module 3. The user is first asked to choose whether to use a previously chosen and stored set of preferences or to enter a new set of preferences (Step 150). Steps 151–165 show the steps in which the user inputs his/her new preferences. In step 152, the user chooses whether to perform a synchronization from scratch or an incremental synchronization. In a synchronization from scratch, synchronization is performed as if this was the first time the two databases were being synchronized. In an incremental synchronization, the History File from the previous file is used to assist with synchronization. The user will likely choose incremental synchronization if there has been a prior synchronization, but the user may choose to synchronize from scratch where the user would like to start with a clean slate (perhaps due to significant change in the nature of the data in the databases). The user then selects the two Applications and related databases (A_Database and B_Database) to be synchronized (step 153). The user then chooses (step 154) whether the Synchronizer should use the default field mapping for those two databases during synchronization or the user will modify the field mapping. Field mapping is generally described in U.S. Pat. No. 5,392,390 (incorporated by reference). In accordance with the user's preferences, the Parameter Table Generator then stores the appropriate A_Database to B_Database fields map (A→B_Map) and B_Database to A_Database fields map (B→A_Map) in the Parameter_Table (Steps 155–158 and 159–163, accordingly).

If in step 150 the user selected to use previously chosen and stored set of preferences (steps 166–171), those preferences are loaded and stored in the Parameter_Table (steps 169–170).

In case of date bearing records such as appointments and ToDo lists, the user enters the date range for which the user wants the records to be synchronized (step 172). The preferred embodiment allows the user to use relative date ranges (Automatic_Date_Range) (substeps 171(*a*) and (*b*)). For example, the user can select the date range to be 30 days into the past from today's date and 60 days into the future from today's date. The Parameter Table Generator 3 then calculates and stores in the Parameter_Table the Start_Current_Date_Range and End_Current_Date_Range values, the two variables indicating the starting point and the ending point of the date range for the current synchronization session (step 173–174).

In steps 174 and 175, various parameters identifying the characteristics of the A_Database and Application and B_Database and Application are loaded from a database (not shown) holding such data for different Applications. These are in turn stored in the Parameter_Table. One of the sets of parameters loaded and stored in the Parameter_Table is the Field_List for the two databases. The Field_List_A and Field_List_B contain the following information about each field in the data structure of the two databases:

1. Field name.
2. Field Type.
3. Field Limitations.
4. No_Reconcile Flag.
6. Key_Field Flag.
7. Mapped_Field Flag.

Field name is the name given to the field which the Translator for this Application uses. This name may also be the name used by the Application. Field Type identifies to the Synchronizer 15 the nature of the data in a field, e.g., Data, Time, Boolean, Text, Number, or Binary. The Field Name does not supply this information to the Synchronizer. Field Limitations identifies the various limitations the database manager imposes on the contents of a field. These limitations include: maximum length of text fields, whether the text field must be in upper-case, range of permissible values (for example, in ToDo records priority field, the range of permissible values may be limited from 1 to 4), and whether a single line or multiple line field.

No_Reconcile flag indicates whether a field is a No_Reconcile field, meaning that it will not be used to match records nor will it be synchronized although it will be mapped and possibly used in synchronization. Almost all fields will not be designated as No_Reconcile. However, sometimes it is necessary to do so. Key_Field flag indicates that a field should be considered as a key field by the Synchronizer 15.

Key fields are used by the Synchronizer in various stages of synchronization as will be discussed in detail below. The decision of identifying certain fields as key is based on examining the various Applications to be synchronized, their data structure, and the purpose for which the database is used. Such examination reveals which fields would best function as key fields for synchronization. For example, for an address book database, the lastname, firstname, and company name field may be chosen as key fields. For Appointments, the date field and the description field may be chosen as key fields.

Mapped_Field flag indicates whether a field is mapped at all. The Synchronizer uses this flag to determine whether it should use the A→B_Map or B→A_Map to map this field. Unlike a No_Reconcile field, an unmapped field will not be carried along through the synchronization.

Another set of parameters in the Parameter_Table identify the Translator Modules 13, 14 for the two Applications which the user has selected. Because each Application is assigned its own Translator, it is necessary to identify to the Command Module and the Synchronizer which Translators should be used.

In step 102 of FIG. 1, the Translation Engine instructs the Synchronizer to load the History File. History File is the file which was saved at the end of last synchronization. It contains the history of the previous synchronization which is necessary for use with the current synchronization in case of Incremental Synchronization. Records from the A_Database and B_Database are analyzed against the records of the history file to determine the changes, additions, and deletions in each of two databases since last synchronization and whether additions, deletions, or updates need to be done to the records of the databases. Referring to FIGS. 5a–5b, in steps 200–201, the Synchronizer finds the appropriate History file to be loaded. If Synchronization_from_Scratch flag is set, the History File is deleted (step 203). If no History File is found, the synchronization will proceed as if it was a synchronization from scratch (step 204). If the Field Lists stored in the History File are not the same as the current Field Lists in the Parameter_Table, or the mapping information is not the same, the synchronization will proceed as synchronization from scratch because the differences indicate that the History File records will not properly match the database records (steps 206–209).

In step 210, the Synchronizer uses the Field_List for database B to create the Workspace 16. It is a large record array which the Synchronizer uses during synchronization. Referring to FIG. 2, Workspace 16 consist of two sections. First, the Synchronizer uses the Field List for the B_Database to make a record array 21 which has all the characteristics of the B_Database record structure. In addition, in each record in the Workspace, certain internal fields are added. One field is_subtype containing Origin Tags. Two other fields, called Rep_Basic and Rep_Excl, are included for all Appointment and ToDo Sections. The Rep_Basic field gives a full description of the recurrence pattern of a recurring record. It includes the following parameters:

1. Basic_Repeat_Type
2. Frequency
3. StopDate
4. other parameters
5. Rep_Excl

Basic_Repeat_Type contains the variable which indicates whether the recurring record is a daily, weekly, monthly (same date each month), monthly by position (e.g., 3rd Friday of each month), yearly (e.g., July 4th each year), yearly by Position (e.g., 3rd Friday of September each year), quarterly, etc. This variable is set to No_Repeat for non-recurring records.

Frequency indicates whether the pattern is, for example, for every week, every other week, etc. StartDate and StopDate show the first date and last date in the pattern. Some other parameters in the Rep_Basic include, for example, a list of days to be included for the pattern (e.g. I plan to hold a weekly staff meeting every Thursday starting Nov. 15, 1997.)

Rep_Excl is the exclusion list. It is a list of dates which at some point belonged to the recurring record, but have since been deleted or modified and no longer are an event represented by the recurring record.

Since some databases do not provide for recurring types of records, the synchronization process sometimes must create single records for each of the instances of a recurring record for those databases. For example, for a recurring lunch every Thursday, the synchronization must produce a single record for each Thursday in such a database. This is accomplished by the process of fanning which uses Rep_Basic. Each of those instances is called a fanned instance. FIG. 6 sets out the preferred embodiment of the process of fanning a record.

Fanning of recurring records also takes into account another set of considerations regarding date range limitations and usefulness of instances to the user.

First, fanning is limited to the applicable date range. Second, the number of fanned instances is limited. When synchronizing Databases A and B, the preferred embodiment permits different sets of limits on fanned instances to be established for each Database. This, for example, assists with managing storage capacity of a memory-constrained handheld device when being synchronized with a database on a desktop PC.

If the current Date Range is large enough to accommodate more than the maximum number of instances which might be generated, those instances will be chosen which are likely to be most useful to the user. In the preferred embodiment, it is assumed that future instances are always more useful than past instances, that near future instances are more useful than distant future instances, and that recent past instances are more useful than distant past instances. Therefore, based on these assumptions, a fanning date range is calculated (FIG. 6, step 236).

Referring to FIG. 2, in the second step of creating the Workspace, the Synchronizer establishes an Extended Index Array 20 which has an index entry associated with each entry in the record array. Each index contains the following variables:

1. Next_In_CIG:
2. Next_In_SKG:
3. Next_In_FIG
4. Key_Field_Hash
5. A_Unique_ID_Hash
6. B_Unique_ID_Hash
7. Non_Key_Field_Hash
8. Non_Date_Hash
9. Exclusion_List_Hash
10. Start_Date&Time
11. End_Date&Time
12. Various bit flags Next_In_CIG is a linkage word, pointing to next member of the same Corresponding Item Group (CIG). A CIG is a group of records, one from each database and the History File, if applicable, which represent the same entry in each of the databases and the History File. There may be one, two or three records in a CIG. Next_In_SKG is a linkage word, pointing to next member of the Same Key Fields Group (SKG). An SKG is a group of records having the same key fields. Next_In_FIG is a linkage word, pointing to the next member of the Fanned Instances Group (FIG). A FIG is the group of fanned instances which correspond to a single recurring record.

Key_Field_Hash is hash of all Key_Fields. A_unique_ID_Hash is hash of unique ID, if any, assigned by A_Database. B_unique_ID_Hash is hash of unique ID, if any, assigned by B_Database. Non_Key_Field_Hash is hash of all Non-Key Match Field, a Match Field being any mapped field which is not flagged as No_Reconcile. Non_Date_Hash is hash of all Non-Date Non-Key Match Fields. Exclusion_List_Hash is hash of recurring record's exclusion list.

Start_Date&Time and End_Date&Time are used for Appointment and ToDo type record only, indicating the start and end date and time of the record. They are used to speed up comparing functions throughout the synchronization. Hash values are also used to speed up the process of comparison. The preferred embodiment uses integer hashes. Hash value computation takes into account certain rules of data value for fields, as will be described in more detail below.

In the preferred embodiment, the record array 21 is stored on magnetic disk of a computer whereas the Extended Index 20 is held resident in memory. The Extended Indexes have record pointer fields which point to each of the records on the disk file.

The Control Module 2 now instructs the synchronizer to load the History File into the Workspace (FIG. 3, step 102). Referring to FIG. 6, the synchronizer loads the records beginning in first available spot in the Workspace (step 211). The Synchronizer then performs an analysis on each of the records and resets some of the values in the records (steps 212–228). The records are also checked against the current date range and those falling outside of it are marked appropriately for Fast synchronization function, which will be described below. In case of recurring records, if any of the instances is within the current date range, then the recurring record itself will be considered within the current date range (steps 217–227).

The synchronizer then builds SKGs by finding for each history record one record which has matching key fields and by placing that record in the SKG of the history record (step 215–216). Referring to FIG. 7, steps 250–258 describe the Key_Field_Match function used for matching records for SKG.

When comparing two records or two fields, in the preferred embodiment, the COMPARE function is used. The COMPARE function is intelligent comparison logic, which takes into account some of the differences between the rules of data value imposed by the A_Application and the B_Application on their respective databases. Some examples are as follows. The COMPARE function is insensitive to upper and lower case letters if case insensitive field attribute is present. Because some Applications require entries to be in all capital letter, the COMPARE function ignores the differences between upper and lowercase letters. The COMPARE function takes into account any text length limitations. For example, when comparing "App" in the A_Database and "Apple" in the B_Database, the COMPARE function takes into account that this field is limited to only 3 characters in the A_Database. It also takes into account limits on numerical value. For example, priority fields in the A_Application may be limited to only values up to 3, whereas in the B_Application there may not be any limitation. The COMPARE function would treat all values in B records above 3 as 3.

The COMPARE function may ignore various codes such as end of line characters. It may strip punctuation from some fields such as telephone numbers and trailing white space from text fields (i.e "Hello " is treated as "Hello"). It also considers field mapping. For example, if the only line that is mapped by the A→B_Map is the first line of a field, then only that line is compared. When comparing appointment fields, because different databases handle alarm date and time differently when Alarmflag is false, the COMPARE function treats them as equal even though the values in them are not the same. It skips Alarm Date and Time, if the Alarm Flag is False. It also ignores exclusion lists when comparing recurring records.

In an alternate embodiment, the COMPARE function may take into account more complicated rules for data value of the two Applications, such as the rules for data value imposed by Microsoft Schedule+, described above. Such a COMPARE function may be implemented as a table driven code, the table containing the rules imposed by the A_Application and the B_Application. Because the COMPARE function has a specific comparison logic and takes into account a number of rules, the hashing logic must also follow the same rules. It should be noted that the COMPARE function is used throughout the preferred embodiment for field comparisons.

Now that the History File is loaded into the Workspace, the Control Module 2 instructs the B_Translator 13 to load the B_Database records (FIG. 3, step 103). Referring to FIG. 8, steps 300–308, the B_Reader module 11 of the B_Translator 13 loads each B_record which has the right Origin Tag, which will be explained in more detail below.

The record must also be within the loading date range, which is a concatenation of the previous and current date ranges. The B_Translator sends these records to the Synchronizer which in turn stores them in the Workspace. When synchronizing with a date range limitation, all records which fall within either the previous or the current date ranges are loaded. The current date range is used during unloading to limit the unloading of the records to only those records which fall within the database's current date range. In an alternate embodiment of the invention, each database or Application can have its own date range for each synchronization.

Most Applications or databases permit record-specific and field-specific updates to a Database. But some Applications or databases do not. Instead the Translator for these Application must re-create the whole database from scratch when unloading at the end of synchronization. These databases are identified as Rebuild_All databases. To accommodate this requirement all records from such a database must be loaded into the Workspace, so that they can later be used to rebuild the whole database. These databases records, which would otherwise have been filtered out by the date range or the wrong origin tag filters, are instead marked with special flag bits as Out_Of_Range or Wrong_Section_Subtype. These records will be ignored during the synchronization process but will be written back unmodified into the database from which they came by the responsible Unloader module 6, 10.

Control Module 2 next instructs the A_Translator 5 to sanitize the B-records. Referring to FIG. 9, steps 350–361, the A_Sanitizer module 8 of the A_Translator 5 is designed to take a record having the form of an A_Record and make it conform to the specific rules of data value imposed by the A_Application on records of the A_Database. A_Sanitizer is not aware which database's field and records it is making to conform to its own Application's format. It is only aware of the A_Application's field and record structure or data structure. Therefore, when it requests a field from the sanitizer using the A_Database field name, it is asking for fields having the A_Database data structure. The Synchronizer, in steps 375–387, therefore maps each record according to the B→A_Map. In turn, when the Synchronizer receives the fields from the A_SANITIZER, it waits until it assembles a whole record (by keeping the values in a cache) and then maps the record back into the B format using the A→B_Map.

How a record or a field is sanitized in step 354 and 357 depends on the rules of data value imposed by the A_Application. For example, all of the logic of intelligent comparison in the COMPARE function described above can be implemented by sanitization. However, sanitization is best suited for more complex or unique types of database rules for data value. For example, consider the Schedule+ rules regarding alarm bearing Tasks records described above. FIG. 10 shows a sanitization method for making records of incompatible databases conform to the requirements of Schedule+. Without sanitization, when a Tasks record of a Schedule+ database is compared to its corresponding record in another database, the Tasks record may be updated in fields which should be blank according to the Schedule+ rules of data value. Such an update may possibly affect the proper operation of Schedule+ after synchronization.

Referring to FIG. 11, following sanitization of all B_Records into the Workspace, the Synchronizer sets the values for the Extended Index of each record based on the record's values (steps 451–459). Also if the records in the B_Database bear a unique ID, and matches for those unique IDs are found in the H_Records in the Workspace, the two records are joined in a CIG because they represent the same record in both History File and B_Database (step 462). The record is also joined to an SKG it may belong to (step 464). The loading of B_Records is now complete.

The Control Module 2 of the Translation Engine 3 now instructs the A_Translator 5 to load the records from the A_Database (step 105). The loading process for the A_Records is the same as the loading process for the B_Database, except for some differences arising from the fact that records in the Workspace are stored according to the B_Database data structure. Therefore, as the synchronizer 15 receives each A_record from the A_Reader module 7 of the A_Translator 5, the Synchronizer maps that record using the A→B_Map before writing the record into the next available spot in the Workspace. Since the A_records are mapped into the B_Record format, when the B_Sanitizer is instructed by the Control Module 2 to begin sanitizing those records and starts asking for them from the synchronizer, they already have the B_Database format. Therefore, the synchronizer 15 does not need to map them before sending them to the B_Sanitizer module 12 of the B_Translator 19. For the same reason, there is no need for them to be mapped once they are sent back by the B_Sanitizer after having been sanitized. Once all the records are loaded, the records will undergo the same orientation analysis that the B_Records underwent (FIG. 11).

At this point, all records are loaded into the Workspace. SKGs are complete since every record at the time of loading is connected to the appropriate SKG. CIGs now contain all records that could be matched based on unique IDs. At this point, the records in the Workspace will be analyzed according to Conflict Analysis and Resolution ("CAAR") which is set out in FIG. 12 and in more detail in FIGS. 13–18 and corresponding detailed description.

First, in step 500, ID bearing fanned instances in the History File records are matched to the fanned instances in the ID bearing database from which they came. The records from the database which have remained unchanged are formed into a new FIG. A new Synthetic Master is created based on those records and joined to them. The records which have been changed or deleted since last synchronization are set free as single records. They also result in a new exclusion list being created based on an old exclusion list and these new single records.

Second, in step 501, matches are sought for the ID based CIGs which are the only CIGs so far created in order to increase the membership of those CIGs. Preferably an exact all fields match is sought between current members of a CIG and a new one. Failing that, a weaker match is sought.

Third, in step 502, master/instances match is sought between recurring records and non-unique ID bearing instances by trying to find the largest group of instances which match certain values in the Recurring Master.

Fourth, in step 503, the items remaining in the SKGs are matched up based on either exact all field match or master/instance match, or a weaker match.

Fifth, in step 501, the appropriate CIG_Types are set for all the CIGs. CIG_Types will determine what the outcome of unloading the records will be.

Referring to FIG. 13, first step in CAAR is analyzing unique ID bearing Fanned Instance Groups. This analysis attempts to optimize using unique IDs assigned by databases in analyzing fanned instances of recurring records.

The analysis is performed for all Recurring Masters (i.e. all recurring records) which have ID-bearing fanned instances (or FIG records) in the H_File (step 550). All FIG records in the History File associated with a Recurring Master are analyzed (steps 551–559). They are all removed from the SKG. If a FIG record is a singleton CIG, it means that it was deleted from the database since the previous synchronization. Therefore, it is added to the New_Exclusion_List (step 553). If a FIG record is a doubleton and is an exact match, it means that the record was not modified since the previous synchronization. In this case, the record from the database is also removed from SKG (step 555). If a FIG record is a doubleton but is not an exact match for its counterpart in the database, it means that the record was changed in the database. The History File record is treated as a deletion and therefore added to the New_Exclusion_List. The modified record in the database, which does not match the recurring record any longer, is treated as a free standing record un-associated with the Recurring Master (step 557).

Upon analysis of all FIG records, a new record, the Synthetic Master, is created and joined in a CIG with the Recurring Master (step 231–236). The Synthetic Master has the same characteristics as the Recurring Master, except that it has a new exclusion list which is a merger of the New_Exclusion_List and the Exclusion_List of the Recurring Master (step 563). Also a new FIG is created between the Synthetic Master and the CIG-mates of all FIG records from the History File (step 565).

In steps 567–569, the Synchronizer checks to see if there are some instances of the Recurring Master which fall within the previous synchronization's date range but fall outside of the current synchronization's date range. If so, the Fan_Out_Creep flag is set, indicating that the date range has moved in such a way as to require the record to be fanned for the database before unloading the record. The Fan_Out_Creep flag is an increase in the value in the Non_Key_Field Hash of the Recurring Master. In this way, the Recurring Master during the unloading of the records will appear as having been updated since the last synchronization and therefore will be fanned for the current date range.

In step 570, all the FIG records analyzed or created in this analysis are marked as Dependent_FIGs. This results in these records being ignored in future analysis except when the recurring records to which they are attached are being analyzed.

At the end of the above analysis, all the records having a unique ID assigned by their databases have been matched based on their unique ID. From this point onward, the records which do not have unique IDs must be matched to other records based on their field values. In the preferred embodiment, there are two categories of field value matches: strong matches and weak matches. A strong match between two records that have matching key fields is when non-key fields of the two records match or it is a Recurring Master and a fanned instance match (FIG. 14, steps 606–610). Referring to FIG. 15, a weak match between two records that have matching key fields is when the following are true: each of the two records are from different origins, because two records from the same source should not be in a CIG (e.g., A_Database and History File); each is not a weak match for another record because there is no reason to prefer one weak match over another; each is not a Dependent_FIG since these records do not have an independant existence from their recurring masters; both records are either recurring or non-recurring since a recurring and a nonrecurring should not be matched except if one is an instance of the other in which case it is a strong match; and, in case of non-recurring, they have matching Key_Date_Field which is the same as the Start_Date in the preferred embodiment because items on the same date are more likely to be modified versions of one another.

Referring to FIG. 14, these two types of matching are used to match records to existing CIGs for History File records which have been created based on matching unique IDs. Only doubleton CIGs are looked at, because singleton CIGs are handled in step 504 of FIG. 12 and tripleton CIGs are complete (steps 601–604). If a strong match is found, then if the record was a weak match in another CIG, it is removed from that CIG, and new weak match is found for that CIG (612–614). While weak matches are left in SKGs in case they will find a strong match, strong matches are removed from their SKGs (step 614). If a strong match is not found, then a weak match is sought (steps 617–620). All records in the CIG are removed from SKG if no weak match is found, because this means that there is no possibility of even a weak match for this record (step 619).

The next step in CAAR is finding non-unique ID bearing instances for recurring items (FIG. 12, step 503). Referring to FIGS. 16a–16b, this analysis takes place only if the database from which instances matching a recurring record are sought does not provide unique ID or if we are synchronizing from scratch (steps 650–653). The goal of this analysis is to find matching instances for each Recurring Master from a different source than the Recurring Master. This analysis counts the number of records in SKG of the Recurring Master which have matching Non_Date_Hash value (steps 665–669). The group of matching SKG records having the same non_Date_Hash value and having the highest number of members (if the number of members exceeds 30% of unexcluded instances) is then formed into a Homogeneous_Instances_Group (steps 670–672). A Synthetic Master is created using the Rep_Basic of the Recurring Master and using the values from the homogeneous instances group. An Exclusion list is created based on the items belonging to the recurrence pattern but missing from the Homogeneous_Instances_Group. The Synthetic Master is added to the CIG of the Recurring Master (steps 673–678). A new FIG for the Synthetic Master is then created using the Homogeneous_Instances_Group (step 679). These records are removed from any CIGs to which they belonged as weak matches and new weak matches are sought for those CIGs (steps 680–684). Since the records in Homogeneous_Instances_Group have now been matched to a recurring record, they are marked as Dependent_FIGS. (step 683). The Recurring Master's CIG is then marked with Fan_Out_Creep flag, if necessary (step 685).

The next step in CAAR is completing analysis of records in SKGs (FIG. 12, step 504). Referring to FIG. 17, this analysis attempts to increase the population of CIGs up to a maximum by finding key field based matches with records from a source different from those of the CIG records. This analysis is performed by analyzing all the records in the SKGs except for the singleton SKGs (steps 703 and 712). The first thing is to remove any members that have already been marked as WEAK matches attached to ID-based doubleton CIGs. Those are left in the SKG up to this point to allow for the possibility that a STRONG match would be found instead. But that is not possible any longer (steps 713–715). Once the weak matches have been removed, all remaining SKG members belong to singleton CIGs. Any non-singleton CIGs which are formed from here on will be purely key field based.

Throughout the remaining SKG Analysis we are careful not to seek H_Record-A_Record or H_Record-B_Record matches for unique ID-bearing Source, since that would violate the exclusively ID-based matching scheme that applies in such cases. Note however that an A_Record-B_Record match is acceptable even if both A_Database and B_Database are unique ID-bearing databases.

Given that Key Field should not be performed where ID based matches are available (or otherwise there may be matches between records with differing IDs), there are limits to how big CIGs can get at this point. If both A and B_Databases are unique ID-bearing, any remaining H_Record must remain in Singleton CIGs, because they are prohibited from forming key fields based matches with items from either databases. Such H_Records are simply removed from the SKG when they are encountered. If just one of the two databases being synchronized is unique ID-bearing then the maximum population that any CIG can now attain is 2 (FIG. 18, steps 750–751). If neither database is unique ID bearing then the CIG_Max_Size is three. For every CIG which is analyzed in FIG. 17, the CIG_Max_Size is set according to this logic. When a CIG reaches its maximum possible population all of its members are removed from the appropriate SKG.

First, strong matches for the H-records are searched for, before trying to find A-B matches. If both Databases are non-unique ID-bearing then two strong matches for each H_Record, an H-A and an H-B match, are sought (steps 715–720). If finding a strong match results in reaching the CIG_Max_Size, all members of the CIG are removed from the SKG (step 721).

When maximum CIG population is 3, weak matches are sought for strong matching CIG doubleton in order to build triplet CIGs. The first weakly matching SKG member is added to the CIG (steps 722–728). Whether or not a weak match is found for any of the doubleton CIGs, its members are removed from the SKG (step 726). As there are no strong matches left in the SKG, weak matches are found for any remaining SKG members and joined to them in CIGs (steps 722–725).

At this stage, all CIGs are built. They must now be examined to determine what needs to be done to these records so that the databases are synchronized, i.e. whether the records in the CIGs need to be added, deleted or changed in the two databases. First step is determining the CIG_TYPE which represents the relation between the records. The following CIG types are defined, all using a 3-digit number that represents values found for A_DATABASE, History File, and B_Database, respectively:

1. 001—record is "new" in the B_DATABASE
2. 010—record is present in History, but absent in both A_Database and B_Databases
3. 100—record is "new" in the A_Database
4. 101—record is "new" in both A_Database and B_DATABASE; same in both 5. 102—record is "new" in both A_Database and B_DATABASE; different in each (conflict)
6. 110—record deleted from B_DATABASE
7. 011—record deleted from A_Database
8. 012—record deleted from A_Database and changed on B_DATABASE (DEL vs CHANGE conflict)
9. 210—record changed on A_Database and deleted from B_DATABASE(DEL vs CHANGE conflict)
10. 111—record unchanged since previous synchronization
11. 112—record changed on B_DATABASE only since previous synchronization
12. 211—record changed on A_Database only since previous synchronization
13. 212—record changed identically on both since previous synchronization
14. 213—record changed differently on each since previous synchronization (conflict)
15. 132—a conflict (102 or 213) was resolved by forming a compromise value; Update both
16. 13F—created when a 132 Update both CIG is Fanned into the B_DATABASE FIGS. 19*a*–19*b* shows the method used for setting all except the last two CIG_Types which are set in other operations.

Four of the CIG types assigned above involve conflicts: 102, 213, 012, and 210. Conflicts are those instances where a specific conflict resolution rule chosen by the user or set by default, or the user's case by case decision, must be used to determine how the records from the databases should be synchronized. CIG types 012 and 210 are cases where a previously synchronized record is changed on one side and deleted on the other. In the preferred embodiment, such conflicts are resolved according to the rule that CHANGE overrules the DELETE. So the net result for CIG type 012 is to add a new record to the A_Database to match the record in the B_DATABASE. The reverse is true for CIG type 210, where a new record is added to the B_Database. In an alternate embodiment, the user may be allowed to register an automatic preference for how to resolve such conflicts or decide on a case-by-case basis a conflict resolution option.

The other two conflict types—102 and 213—are resolved in the preferred embodiment according to the Conflict Resolution Option established by the user. First, the user may choose to ignore the conflict. This option leaves all 102 and 213 conflicts unresolved. Every time synchronization is repeated the conflict will be detected again and ignored again, as long as this option remains in effect and as long as the conflicting records are not changed by other means.

The user may choose to add a new record to each of the two databases. This option resolves 102 and 213 conflicts by adding the new A_Record to the B_Database, and adding the new B_Record to the A_Database. This option is implemented by breaking a 102 CIG into two separate CIGs (types 100 and 001) and a 213 CIG into three separate CIGs (types 100, 010, and 001). Subsequent processing of those descendant CIGs causes new records to be added across and stored in the History File.

The user may elect that A_Database records should always trump or win over B_database records. This option is implemented by changing the CIG type to 211—the processing during unloading the records changes the record value in the B_Database to match the current record value in the A_Database.

The user may elect that B_Database records should always trump or win over B_database records. This option is implemented by changing the CIG type to 112—the processing during unloading the records changes the record value in the A_Database to match the current record value in the B_Database.

The user may choose to be notified in case of any conflict. The user is notified via a dialog box 30, shown in FIG. 20, whenever a CIG type conflict of 102 or 213 arises. The dialog box shows the record that is involved in the conflict 31. It also shows the A_Database 32 and B_Database 33 values for all conflicting fields, in a tabular display, with Field Names appearing in the left column 34. A dropdown list (not shown) in the lower left hand corner of the dialog 37, offers a total of three choices—add, ignore, and update. The use may choose to add new records or ignore the conflict. The user may also choose that the A_Record or B_Record should be used to update the other record. The user may also decide to create a compromise record by choosing values of different fields and then choosing update option. In this case, the CIG type is changed to 132, which results in an updating both databases with the new record compromise record.

When the user has chosen to be notified in case of conflict, if the user chooses to ignore conflict or that either the record of the A_Database or the B_DATABASE should win, the CIG type is left as a conflict CIG type (102 or 213) and a separate Conflict Resolution Choice is stored in the FLAGS word associated with each CIG member.

The final step in setting CIG_Types is the process for dealing with difficulties which arise from exclusion lists. For example, in a triple Recurring Master CIG, suppose the History File Recurring Master does not have any excluded instances. The A_Record has the following exclusion list:

12/1/96, 12/8/96

The B_Record has the following exclusion list:

1/1/97, 1/8/97, 1/15/97, 1/22/97, 1/29/97

If comparison of the Recurring Masters includes comparing exclusion list Field Values, this set of changes would cause the Synchronizer to report a CIG type 213 conflict.

If the Conflict Resolution Option is set to A_Database record wins, then the outcome prescribed by the Synchronizer would be for the A_Database to keep its exclusion list as is and for the B_Database to make its exclusion list match that of the A_Database.

The result would be to have a lot of duplicate entries in both Databases. The A_Database would have five duplicate entries in January 97—that is the five unmodified Recurring Master instances, plus the five modified instances added across from B_Database to A_Database. The B_Database would have five duplicate entries in January 97, since synchronization has wiped out the five exclusions that were previously recorded in the B_Database exclusion list.

Two steps are implemented for dealing with this problem. First, the COMPARE function does not take into account exclusion list differences when comparing recurring records. Second, referring to FIG. 21, any new exclusions added on to one recurring record will be added to the other record. The merging of exclusion lists is done regardless of any updates or conflicts, even unresolved conflicts, between the A_Database and B_Database copies of a Recurring Master. One exception is for CIG type 102 conflict which is left unresolved where Exclusion lists are not merged, because the user has chosen to leave those records as they are.

In most cases where it is necessary to merge exclusion lists, the CIG types and/or the Conflict Resolution Choice to arrange for all necessary updates to be performed during the unloading phases of synchronization.

First, A_Database and B_Database records' exclusion lists are compared. In case of databases which do not permit recurring items, the exclusion list of the Synthetic Master is compared to the recurring record of the other database (step 852). If there is no difference, then nothing is done (step 853). If there are differences, then it is determined which exclusions appear only in one record. This comparison always yields one of the following scenarios: (1) all one-side-only Exclusions are on the A_Database (so Exclusions should be added to the B_Database); (2) all one-side-only Exclusions are on the B_Database (so Exclusions should be added to the A_Database); and (3) there are one-side-only Exclusions on both sides (so Exclusions should be added to both databases).

In each of these cases a separate table is used to look up instructions, for how to handle each specific situation (FIGS. 22–24). The tables cover all possible combinations of previous CIG types and outcome codes with all possible exclusion list changes (new and different exclusions added on A_Database, or on B_Database, or on both sides). FIG. 22 table is used in case of scenario 1. FIG. 23 table is used in case of scenario 2. FIG. 24 table is used in case of scenario 3 (FIG. 21 steps 854–856).

The analysis of records is now complete, and the records can be unloaded into their respective databases, including any additions, updates, or deletions. However, prior to doing so, the user is asked to confirm proceeding with unloading (FIG. 3, step 108–109). Up to this point, neither of the databases nor the History File have been modified. The user may obtain through the Translation Engine's User Interface various information regarding what will transpire upon unloading.

If the user chooses to proceed with synchronization and to unload, the records are then unloaded in order into the B_Database, the A_Database and the History File. The Unloader modules 6,10 of the Translators 5,9 perform the unloading for the databases. The Synchronizer creates the History File and unloads the records into it. The Control Module 2 of the Translation Engine 1 first instructs the B_Translator to unload the records from Workspace into the B_Database. Referring to FIGS. 25a–25b, for each CIG to be unloaded (determined in steps 902–907), based on the CIG_TYPE and which database it is unloading into (i.e., A or B), the unloader looks up in the table in FIGS. 26a–26b the outcome that must be achieved by unloading—that is, whether to update, delete, add, or skip (Leave_Alone) (step 908). In steps 909–913, the unloader enforces date range restriction for a database subject to date range. The user may select, or a selection may be made by default, whether to enforce the date range sternly or leniently. In case of stem enforcement, all records outside of the current date range would be deleted. This is useful for computers with small storage capacity. In case of lenient enforcement, the records are left untouched.

Based on the result obtained from looking up the unloading outcome in the table, the unloader then either adds a new record (steps 920–926), deletes an existing record (steps 914–919), or updates an existing record (steps 927–933). It should be noted that because we only update those fields which need to be updated (step 928), the fields which were sanitized but need not be updated are not unloaded. Therefore, the values in those fields remain in unsanitized form in the database.

Referring to step 914, in some Applications when a Recurring Master must be added or updated, the record may have to be fanned out despite the ability of the Application to support recurring records. For example, the Schedule+ Translator is generally able to put almost any Recurring Master Item into Schedule+ without fanning, but there are some exceptions. The Schedule+ Translator uses one Schedule section to handle all appointments and events. For appointments, almost any recurrence pattern is allowed, but for events the only allowable true repeat type is YEARLY. DAILY recurring events can be dealt with by being translated into Schedule+ multi-day events which are not recurring but extend over several days by setting the EndDate some time after the Start Date. But for the DAILY case there are restrictions. In particular exclusions in the midst of a multi-day Schedule+ event cannot be created. So the Translator decides that if section type is ToDos or the item is a non-Event Appointment, then the record need not be fanned out. But if item is a YEARLY or DAILY with no exclusions then it can be stored as a Schedule+ yearly or daily event. Otherwise, it must be fanned.

Referring to FIGS. 27a–27b, steps 950–984 set out the preferred embodiment of fanning recurring records that must be updated. All cases fall within three scenarios, shown in FIG. 29.

In the first scenario a record which is a Recurring Master, and its counterpart in the other database is a Recurring Master, must be fanned now for its own database (steps 951–959). If the CIG_TYPE of the record is 132 (i.e. update both records), then it is changed to 13F which is a special value specifically for this situation (step 951). For other CIG_Types, the CIG is broken into three singleton and given CIG_Types signifying their singleton status. In both of these cases, the function Fanning_For_Add (steps 986–996, described below) is called.

In the second scenario, the record was fanned previously and is going to be fanned now also. First, the dates of the instances are recorded in a temporary date array (steps 961–963). This array is compared to an array of the fanned instances of the recurrence pattern of the CIG Recurring Master from the other database (steps 965–966). The dates which are not in the array of fanned instance are marked for deletion (step 967). The dates which are not in the temporary date array should be added to the unloading databases and therefore new FIG records are created for those dates (steps 968–973). The dates which appear in both arrays are compared to the Synthetic Master and marked accordingly for UPDATE or Leave_Alone (steps 974–978).

In the third scenario, the record which was previously fanned should now be fanned also. The opposing database's record in this scenario is also fanned instances. This is perhaps the most peculiar of the three cases. For example, a database may be able to handle multi-day (i.e. daily recurring) records but not any exclusion dates for such items. Such database may be synchronized with another database which fans all records in the following manner. A record representing a 7-day vacation in the Planner section of the database is fanned out to form 7 individual vacation days in the other database. One instance is deleted in the other database. Upon synchronizing the two databases, b/c the first databases does not does not provide for exclusion lists, the record must now be fanned.

In this scenario, Master Records in a CIG are marked as Garbage. Any FIG members attached to the H_Record, if any, are also marked as Garbage. All Instances found in the opposing database's FIG are truned to singleton CIGs with CIG type 100 or 001 so that they will be added to the CIG type when unloading is done. In this way the instances from one database is copied to the database providing for recurring records.

Steps 985–995 describe the Fanning_For_Add Function which is used when outcome is to update or when the function is called by the Translator fanning for update. For each instance generated by fanning out the recurring record, a clone of the Recurring Master is created but excluding Rep_Basic and Rep_Excl field values and the unique ID field. All adjustable Date Fields (e.g. Start Date, End Date, and Alarm Date) are set and hash values for the new record is computed. The new record is then marked as Fanned_For_A or Fanned_For_B, as the case may be. This is then attached to the Recurring Master Item as a FIG member.

Following unloading of the B_RECORDS, the Control Module 2 instructs the A_Translator to unload the A_Records from the Workspace (FIG. 3, step 111). This unloading is done in the same way as it was done by the B_Translator. In case of Rebuild_All Translators which have to reconstruct the database, all records which were loaded from the database but were not used in synchronization are appended and unloaded as the Translator builds a new database for its Application.

The Control Module 3 next instructs the Synchronizer to create a new History File (step 112). Referring to FIG. 28, for every CIG in the Workspace, it is first determined which record should be unloaded to History File (steps 1001–1003). In the next step, Excl_Only flag is checked, which is set by the Merge_Exclusion_List logic (FIGS. 21–24). If that flag is set, a new record for unloading is created which has all fields taken from the History File record, except that the newly merged exclusion list is inserted into that record (step 1004). Before storing the record in the History File, all Flag Bits in the Extended Index are cleared except the bit that indicating whether or not this is a recurring item (step 1005). The item is marked as a History File record to indicate its source. The CIG, FIG, and SKG are reset. All the HASH values and Start&EndDate&Time will be stored. All applicable unique ID are also stored (Steps 1006–1009). The current record is then stored in the new History File (step 1010). If the current record is a Recurring Master for an ID-bearing FIG, we now store the whole FIG (i.e. all Fanned Instances) in the History File, with the FIG linkage words set in the History File to hold the FIG records together (step 1011). Fanned instances which do not bear unique IDs are not stored in the History File since they can be re-generated by merely fanning out the Recurring Master.

Once all records are unloaded, various information necessary for identifying this History File and for the next synchronization are written into the History File (step 1013).

At this point Synchronization is complete.

Applications, such as scheduling Applications, often have more than one database. Each of these databases are known as sections. Each of these sections contain different data and must be synchronized with their corresponding sections in other Applications. However, there is not necessarily a one to one relationship between sections of various Applications. For example, Application A may comprise of the following sections: Appointments, Holidays, Business Addresses, Personal Addresses, and ToDo. Application B however may comprise of the following sections: Appointments, Addresses, ToDo-Tasks, and ToDo-Calls. Although the general character of the sections are the same, there is not a one to one relation between the sections of these two Applications: Appointments and Holidays in A contain the same type of data as Appointments in B; Business Addresses and Personal Addresses in A contain the same type of data as Addresses in B; and ToDo in A contains the same type of data as ToDo-Tasks and ToDo-Calls in B. Therefore, when synchronizing the sections of these two Applications, it is necessary to synchronize at least two sections of one Application with one section of another Application.

The preferred embodiment performs this type of synchronization by providing for a number of section categories: Appointment, ToDo, Note, Address, and General Database. All sections of a particular Application are studied and categorized according to this categorization. Therefore, in the above example of Application A, Appointments and Holidays are categorized Appointment type sections (or database), Business Address and Personal Address as Address type sections, and ToDo as a ToDo type section.

For creating the map for mapping sections onto each other, an exact section match is always sought between sections of the two Applications. If not, one of the sections which were categorized as a section type is chosen to be the Main_Section among them. Other sections of the same type are referred to as subsections. All databases of the same type from the other Application will be mapped onto the Main_Section.

To properly synchronize from one time to the next, it is necessary to keep track of the source of records in the Main_Section. In the preferred embodiment, if a record in the Main_Section of the A_Application does not come from the Main_Section of the B_Application, one of fields in the record, preferably a text field, is tagged with a unique code identifying the subsection which is the source of the record. This is the record's Origin Tag. All records in the Workspace and the History File include a hidden internal field called _subType which contains the unique subsection code. Main_Section's field value in the preferred embodiment is zero so that it will not be tagged. When a record is loaded from a database into the Synchronization Workspace, the tag is stripped from the TagBearer field and put in the _subType field. If there is no tag, then the _subType is set to be the subType of the present section. If the TagBearer field is mapped then when reading records into the Workspace the tag, if any, is stripped from the TagBearer field value place it in _subtype.

Conversely when unloading records from the Workspace to a Database, the TagBearer field is tagged by a tag being added if the record is not from the Main_Section.

A Fast Synchronization database is a database which provides a method of keeping track of changes, deletions, and additions to its records from one synchronization to the next. These databases speed up the synchronization process because only those records which have been modified need to be loaded from the database. Since the majority of records loaded by regular Translators are unchanged records, far fewer records are loaded from the database into the Synchronizer.

Certain features are required for a database to be a Fast Synchronization database. The database records must have unique IDs and must have a mechanism for keeping track of which records are added, changed, or deleted from synchronization to synchronization, including a list of deleted records. Unique IDs are required to accurately identify records over a period of time.

There are at least two ways to keep track of additions, changes, and deletions in a database.

First, some databases maintain one Dirty bit per record which is a boolean flag that is set when a record is created or modified and is cleared when a function for clearing Dirty bits is called. Some databases offer a Clear DirtyBit function that clears the bit of an individual record. Other databases offer a ClearDirtyBits function that clears the Dirty bits of all records in a database. The record-specific ClearDirtyBit function allows the preferred embodiment to use the database itself to keep track of additions and changes.

The global ClearDirtyBits function forces the preferred embodiment to clear all Dirty bits at the conclusion of every Synchronization. Then as database edits are made by the user in between synchronizations, the affected records are marked as Dirty. When Synchronization is performed again, only the Dirty records are loaded.

Second, some databases maintain a Date&Time stamp of when the record was added or last time the record was modified. A Translator for such a database finds all records which were added or modified since the previous synchronization by searching for Date&Time stamps more recent than the Date&Time of the Last Synchronization.

A Fast Synchronization database must also keep track of deletions. This is done by maintaining a list of deleted records which can be read by a Translator.

A Translator sending Fast Synchronization database records to the Synchronizer provides only records which have been changed, deleted, and added since the previous synchronization. Therefore, unlike a regular database Translator, a Fast Synchronization Translator does not provide the Synchronizer with unchanged records. Moreover, unlike a regular Translator it provides deleted records, which the regular Translators does not.

In order for such databases to be synchronized without resorting to treating them as regular databases, the Synchronizer transforms Fast Synchronization records from the Translator into the equivalent regular database records. These transformed records are then used by the Synchronizer in the synchronization. There are two transformations which are necessary. First, the Synchronizer needs to transform deleted records received from the Fast Synchronization Translator into a regular database deletions. Second, synchronization needs to transform lack of output by the Fast Synchronization Translator into unchanged records.

The invention performs these transformations by using the History File. During the first synchronization, all records in the Fast Synchronization database are loaded into the history file. As changes, additions, and deletions are made to the Fast Synchronization database, during each of the subsequent synchronizations the same change, additions, and deletions are made to the History File. Therefore, the History File at the end of each subsequent synchronization is an exact copy of the Fast Synchronization database.

When a Fast Synchronization Translator supplies no input for a unique ID H_Record, the Synchronizer finds the corresponding H_Record in the Workspace and copies it into the Workspace as a record supplied as if it were loaded by the Fast Synchronization translator itself.

Referring to FIG. 30, steps 1050–1051, the Synchronizer first verifies that there is an appropriate History File. Because the Fast Synchronizing process relies heavily on the History File, it is important to ensure that the same history file as the last Synchronization is used. Moreover, the History File is the background against which the transformation of the Translator outputs into regular Translator outputs takes place. The History File keeps a date and time stamp of the last synchronization. Each of the Fast Synchronization database (if able to) and the Fast Synchronization Translator also stores the same date and time stamp. The time and date stamp is used because it is unlikely that another History File will have exactly the same time and date entry, for the same two databases. It also identifies when last the Fast Synchronizer database and the History File contained the same records.

At the start of an incremental synchronization, the Synchronizer and the Fast Synchronization Translator compare date and time stamps. If time and date stamp synchronization parameters have changed since the previous synchronization, then the synchronization proceeds from scratch (step 1052). In a synchronization from scratch all records in the Fast Synchronization database are loaded into the History File.

In the preferred embodiment, all records supplied as Fast Synchronization inputs have a special hidden field called _Delta, which carries a single-letter value—'D' for Delete or 'A' for Add and 'C' for Change. Records are loaded by the Fast Synchronization Translator into the Workspace (step 1054). If necessary the records are mapped when loaded. Records which are marked as changes or additions are sanitized by the Translator for the other database, but deleted records are not because their field values are going to be deleted (step 1055). Orientation analysis (FIG. 11) is performed on the records so that all deletions and changes to Fast Synchronization database records are joined with their History File counterparts in unique ID bearing CIGs (step 1107).

All History File records and their CIGs are now examined. If there is no corresponding record from the Fast Synchronization database, it means that the record was unchanged. A clone of the record is made, labelled as being from Fast Synchronization database, and joined to the H_Record's CIG. At this point the deleted Fast Synchronization database records marked as deletions are removed from CIGs (step 1109). The Fast Synchronization records marked as changed are joined in doubleton CIGs. Those marked as additions are singletons. At this point, the synchronization can proceed as if record of a unique ID bearing regular database were just loaded into the Workspace.

Whenever we are loading from a Fast Synchronization database, all records are loaded so that at the end of synchronization the history file will be the same as the Fast Synchronization Database. Therefore, referring to FIG. 31, in order to perform date range limited synchronization, the invention marks the records which fall outside the current and the previous date ranges. For a record marked as an addition, or during synchronizing from scratch, if the record falls outside the current date range, it is marked as Out_Of_Range (steps 1101 and 1153–1154). This record will be written into the History File but not into the other database or take part in the synchronization. When the Fast Synchronization database records are loaded from the History File, if they fall outside of the previous date range, they are marked as Bystander (steps 1152–1157). If a Bystander record forms a CIG with a Fast Synchronization record marked as a deletion or a change, the Bystander is marked with a Garbage flag because its field values serve no useful purpose any more: the record marked as DELETION should be deleted and the record marked as CHANGED should replace the Bystander H_Record (step 1162).

H_Records for which there are no inputs are transformed in the same manner as before (steps 1164–1165). If a Bystander record falls within the current date range, it is equivalent to a regular database record coming into the current date range. Therefore, the H_Record is cloned and marked as a Fast Synchronizer record while the Bystander record is marked as Garbage (steps 1166–1171). Therefore, just like a new record of a regular database, it has no H_Record counterpart.

If the user selects to abort a synchronization or selects the option to ignore a conflict or conflicts in general, some of the records loaded from the Fast Synchronization database will not be accepted and recorded in the History File. Therefore, the Translator should provide that record again at the next synchronization. However, because Fast Synchronization Translators supply only records which have been changed, deleted, or added since the previous synchronization, the records which were not accepted will not be supplied. Therefore, in the invention, Fast Synchronization Translator waits for an acknowledgement from the Synchronizer that the record has been accepted.

In case no such acknowledgement is received for a record, the Translator needs to be able to provide that record again to the Synchronizer. If the database allows resetting individual Dirty bits, the Translator merely does not set that bit. If not, the Translator keeps a separate file in which it keeps a record of which Fast Synchronization records were not accepted. The file may contain the unique IDs of those records. The Translator then uses that file to provide the synchronizer with those records during the next synchronization.

Other embodiments are within the following claims.

What is claimed is:

1. A computer implemented method of synchronizing records of first and second databases, the records of the first and second databases being characterized respectively by first and second record structures, wherein the first record structure is different from the second record structure thereby making the first and second databases incompatible, wherein at least one field of records of the first database is subject to a first rule of data value to which the corresponding field of records of the second database is not subject, the method comprising:

comparing the content of the one field to the content of the corresponding field of the second database and in performing the comparison applying the first rule of data value, thereby comparing the records of the incompatible databases;

taking synchronization actions based on the outcome of the comparison.

2. The method of claim 1 wherein at least one field of records of the second database is subject to a second rule of data value to which a corresponding field of records of the first database is not subject, wherein the computer program further comprises applying the second rule of data value in performing a comparison of the content of the corresponding field of records of the first database to the content of the at least one field of the second database.

3. The method of claim 1 wherein applying the first rule of data value comprises:

using the first rule of data value to modify a corresponding field of records representative of the records of the second database; and thereafter comparing the content of the modified corresponding field of the representative records to the content of the one field.

4. The method of claim 1 wherein the content of the one field comprises at least a first portion and a second portion and the first rule of data value requires the presence of the second portion, and wherein applying the first rule of data value comprises comparing only the first portion to the content of the corresponding field.

5. The method of claim 1 wherein the content of the corresponding field comprises at least a first portion and a second portion and the first rule of data value prohibits the content of the one field from containing the second portion and wherein applying the first rule of data value comprises comparing only a first portion of the content of the corresponding field to the one field.

6. The method of claim 1 wherein the first rule of data value requires the content of the one field of the first database to have a specified value and wherein applying the first rule of data value comprises omitting comparison of the content of the one field with the content of the corresponding field.

7. The method of claim 1 wherein the first rule of data value limits the content of the one field to a first specified value and wherein applying the first rule of data value comprises setting the first specified value equivalent to a second specified value of the content of the corresponding field.

8. The method in claim 7 wherein the first specified value comprises a value selected from a range of values.

9. The method in claim 7 wherein the second specified value comprises a value selected from a range of values.

10. The method of claim 1 wherein applying the first rule of data value consists of one of:

a) comparing only a portion of the content of the one field to the content of the corresponding field;

b) comparing only a portion of the content of the corresponding field to the content of the one field;

c) omitting comparison of the content of the one field with the content of the corresponding field;

d) setting a first specified value of the one field equivalent to a second specified value of the corresponding field.

11. The method of claim 1 wherein the first rule of data value consists of one of:

a requirement that the content of the one field be in upper case;

a requirement that the content of the one field have a specified form of punctuation;

a requirement that the content of the one field have a specified form of spacing;

a requirement that the content of the one field have a value limited to a specified range of values;

a requirement that the content of the one field have a first specified value based on the content of another field;

a requirement that the content of the one field be limited to a specified length; and a requirement that the content of the one field include a specified code.

12. A computer program, resident on a computer readable medium, for synchronizing records of first and second databases, the records of the first and second databases being characterized respectively by first and second record structures, wherein the first record structure is different from the second record structure thereby making the first and second databases incompatible, wherein at least one field of records of the first database is subject to a first rule of data value to which the corresponding field of records of the second database is not subject, the computer program comprising the steps for:

comparing the content of the one field to the content of the corresponding field of the second database and in performing the comparison applying the first rule of data value, thereby comparing the records of the incompatible databases;

taking synchronization actions based on the outcome of the comparison.

13. The computer program of claim 12 wherein at least one field of records of the second database is subject to a second rule of data value to which a corresponding field of records of the first database is not subject, wherein the computer program further comprises applying the second rule of data value in performing a comparison of the content of the corresponding field of records of the first database to the content of the at least one field of the second database.

14. The computer program of claim 12 wherein applying the first rule of data value comprises:

using the first rule of data value to modify a corresponding field of records representative of the records of the second database; and thereafter comparing the content of the modified corresponding field of the representative records to the content of the one field.

15. The computer program of claim 12 wherein the content of the one field comprises at least a first portion and a second portion and the first rule of data value requires the presence of the second portion, and wherein applying the first rule of data value comprises comparing only the first portion to the content of the corresponding field.

16. The computer program of claim 12 wherein the content of the corresponding field comprises at least a first portion and a second portion and the first rule of data value prohibits the content of the one field from containing the second portion and wherein applying the first rule of data value comprises comparing only a first portion of the content of the corresponding field to the one field.

17. The computer program of claim 12 wherein the first rule of data value requires the content of the one field of the first database to have a specified value and wherein applying the first rule of data value comprises omitting comparison of the content of the one field with the content of the corresponding field.

18. The computer program of claim 12 wherein the first rule of data value limits the content of the one field to a first specified value and wherein applying the first rule of data value comprises setting the first specified value equivalent to a second specified value of the content of the corresponding field.

19. The computer program in claim 18 wherein the first specified value comprises a value selected from a range of values.

20. The computer program in claim 18 wherein the second specified value comprises a value selected from a range of values.

21. The computer program of claim 12 wherein applying the first rule of data value consists of one of:
   a) comparing only a portion of the content of the one field to the content of the corresponding field;
   b) comparing only a portion of the content of the corresponding field to the content of the one field;
   c) omitting comparison of the content of the one field with the content of the corresponding field;
   d) setting a first specified value of the one field equivalent to a second specified value of the corresponding field.

22. The method of claim 12 wherein the first rule of data value consists of one of:
   a requirement that the content of the one field be in upper case;
   a requirement that the content of the one field have a specified form of punctuation;
   a requirement that the content of the one field have a specified form of spacing;
   a requirement that the content of the one field have a value limited to a specified range of values;
   a requirement that the content of the one field have a first specified value based on the content of another field;
   a requirement that the content of the one field be limited to a specified length; and
   a requirement that the content of the one field include a specified code.

* * * * *

UNITED STATES PATENT AND TRADEMARK OFFICE
CERTIFICATE OF CORRECTION

PATENT NO. : 6,532,480 B1
DATED : March 11, 2003
INVENTOR(S) : David J. Boothby

It is certified that error appears in the above-identified patent and that said Letters Patent is hereby corrected as shown below:

Title page,
Item [56], References Cited, OTHER PUBLICATIONS, the first reference, "powre" should be -- power --; and "Bowen et al." reference, "IEE" should be -- IEEE --.

Drawings,
FIG. 30, line 1059, "marked as a a" should be -- marked as a --.

Column 4,
Line 21, "pseudocoe" should be -- pseudocode -- and "loadin" should be -- loading --.

Column 10,
Line 33, "Application" should be -- Applications --.

Column 16,
Line 15, "use" should be -- user --.
Line 21, after "updating", insert -- of --.

Column 17,
Line 50, "stem" should be -- stern --.

Column 18,
Line 37, "instance" should be -- instances --.
Line 55, "b/c" should be -- because --.
Line 56, "databases" should be -- database -- and delete the second occurrence of "does not".
Line 61, "truned" should be -- turned --.

Column 19,
Line 29, "indicating" should be -- indicates --.

UNITED STATES PATENT AND TRADEMARK OFFICE
CERTIFICATE OF CORRECTION

PATENT NO. : 6,532,480 B1
DATED : March 11, 2003
INVENTOR(S) : David J. Boothby

It is certified that error appears in the above-identified patent and that said Letters Patent is hereby corrected as shown below:

<u>Column 21,</u>
Line 30, after "into", delete "a".
Line 61, "last the" should be -- the last --.

<u>Column 22,</u>
Line 33, "FIG. 31" should be -- FIG. 31a-31b --.

Signed and Sealed this

First Day of June, 2004

JON W. DUDAS
*Acting Director of the United States Patent and Trademark Office*